(12) United States Patent
Ukai et al.

(10) Patent No.: US 7,981,555 B2
(45) Date of Patent: Jul. 19, 2011

(54) METHOD OF OPERATING A FUEL CELL SYSTEM

(75) Inventors: Kunihiro Ukai, Ikoma (JP); Kiyoshi Taguchi, Osaka (JP); Hidenobu Wakita, Yawata (JP); Seiji Fujihara, Amagasaki (JP)

(73) Assignee: Panasonic Corporation, Osaka (JP)

( * ) Notice: Subject to any disclaimer, the term of this patent is extended or adjusted under 35 U.S.C. 154(b) by 68 days.

(21) Appl. No.: 12/360,150

(22) Filed: Jan. 27, 2009

(65) Prior Publication Data

US 2009/0136795 A1   May 28, 2009

Related U.S. Application Data

(62) Division of application No. 10/508,560, filed as application No. PCT/JP03/09629 on Jul. 30, 2003, now abandoned.

(30) Foreign Application Priority Data

Jul. 30, 2002   (JP) ................................ 2002-221270
Feb. 5, 2003   (JP) ................................ 2003-028033

(51) Int. Cl.
   *H01M 8/04*   (2006.01)
(52) U.S. Cl. ........ 429/428; 429/450; 429/437; 429/433; 429/434
(58) Field of Classification Search .................. 429/428, 429/450, 437, 433, 434
See application file for complete search history.

(56) References Cited

U.S. PATENT DOCUMENTS

| 5,047,298 | A | 9/1991 | Perry, Jr. et al. |
| 6,242,119 | B1 | 6/2001 | Komura et al. |
| 7,026,065 | B2 | 4/2006 | Ballantine et al. |
| 7,052,790 | B2 | 5/2006 | Nakamura et al. |
| 2001/0010874 | A1 | 8/2001 | Herdeg et al. |
| 2003/0118881 | A1 | 6/2003 | Walsh et al. |

FOREIGN PATENT DOCUMENTS

| DE | 10130036 A1 | 2/2002 |
| JP | 08-022833 A | 1/1996 |
| JP | 08-138714 A | 5/1996 |
| JP | 09-063611 A | 3/1997 |
| JP | 09-063612 A | 3/1997 |
| JP | 09-306523 A | 11/1997 |
| JP | 09-306524 A | 11/1997 |
| JP | 10-223249 A | 8/1998 |
| JP | 2000-021430 A | 1/2000 |

(Continued)

*Primary Examiner* — Helen O Conley
(74) *Attorney, Agent, or Firm* — Panitch Schwarze Belisario & Nadel LLP

(57) ABSTRACT

A method for operating a fuel cell system having a fuel cell equipped with an anode and a cathode includes the steps of generating electric power by allowing hydrogen gas supplied to the anode and oxygen gas supplied to the cathode to react electrochemically with each other, recovering water from water vapor discharged from at least one of the anode and cathode, storing recovered water in a water storing portion equipped with a tank having a closable drain opening, through which opening water stored in the tank is dischargeable to outside the fuel cell system, supplying water stored in the tank to a water utilizing means by a water supply portion, and making a decision whether or not to discharge the stored water to outside the fuel cell system through the drain opening in view of an increase in an amount of undesirable germs contained in water stored in the water storing portion.

21 Claims, 15 Drawing Sheets

FOREIGN PATENT DOCUMENTS

| | | | |
|---|---|---|---|
| JP | 2000-348752 A | | 12/2000 |
| JP | 2002-112761 | * | 4/2002 |
| JP | 2002-270194 A | | 9/2002 |
| JP | 2002-270211 A | | 9/2002 |
| JP | 2002-343393 A | | 11/2002 |
| WO | 02/23661 A1 | | 3/2002 |
| WO | 02/35632 A1 | | 5/2002 |

* cited by examiner

METHOD OF OPERATING A FUEL CELL SYSTEM

CROSS-REFERENCE TO RELATED APPLICATIONS

The present application is a division of pending U.S. patent application Ser. No. 10/508,560, now abandoned, which is a Section 371 of International Application No. PCT/JP2003/009629, filed Jul. 30, 2003.

BACKGROUND OF THE INVENTION

This invention relates to a fuel cell system provided with a fuel cell which produces electric power by making utilization of hydrogen gas. More specifically, the invention provides a fuel cell system capable of preventing water recovered from such a type of fuel cell from decaying.

With recent increasingly growing recognition of the importance of the global environment protection, fuel cell systems which are small in size but are capable of producing electric power at high levels of efficiency have attracted attention. In addition, when a fuel cell system produces electric power, thermal energy is generated. Accordingly, it is hoped that high levels of energy utilization efficiency are achieved through the use of such thermal energy.

Most of the fuel cell systems of the above-described type use hydrogen for fuel and generate electric power. However, the infrastructure needed for supplying hydrogen to fuel cell systems has still not been provided at present. Consequently, the following procedure has been employed commonly. That is to say, the procedure uses fossil fuels such as natural gas, and hydrogen gas is generated by causing a reforming reaction to take place in the fuel cell system.

Besides, the above-mentioned reforming reaction requires the provision of water, which means that it is very important to secure a water supply source which supplies water to a fuel cell system. In the case where a water infrastructure is always used as a water supply source, the removal of component parts of calcium, chlorine et cetera from the water supplied from the water infrastructure is required. To this end, the fuel cell system has to have a water purifying means (e.g., ion exchange resin) more powerful than usual. This necessitates the execution of regular maintenance work on the water purifying means. As just described, the arrangement that water is always supplied from a water infrastructure gives rise to many disadvantages. In the light of this, for the case of a fuel cell system of a so-called distributed type that is installed in the vicinity of an area in demand of electric power and thermal energy, the procedure of recovering water generated in the inside of the system and making utilization of it, i.e., the water self-supplying procedure, has been employed often.

However, the water recovered in the inside of the fuel cell system does not contain any bactericidal substances such as the component parts of chlorine but does contain undesirable germs and their necessary nourishment. This increases the possibility that the recovered water decays. If the recovered water decays, this will give rise to flow path blockage in a water recovering portion or in a water supply portion, thereby producing problems with the water supply.

With a view to eliminating these drawbacks, there have been made several proposals. For example, there is a first method in which organic materials are decomposed and germ-eradicated by blowing ozone generated by an ozone generator into the recovered water. In addition, in a second method, various germs are eradicated by exposure of the recovered water to ultraviolet irradiation. Furthermore, there is proposed a third method in which, in order to prevent the recovered water from decaying, both a water recovering portion and a water supply portion are formed of material having an antibacterial action. For example, Japanese Patent Application Kokai Publication No. 1996-22833 discloses an exemplary case in which both a water recovering portion and a water supply portion are formed using metal having an antibacterial action.

However, both the first method (i.e., ozone blowing) and the second method (i.e., ultraviolet irradiation) find it difficult to utterly decompose and remove organic materials contained in the recovered water. Besides, if there are members and pipes which come to contact with ozone or are irradiated with ultraviolet light and which are formed of resin material, these components deteriorate significantly, therefore producing another problem that water leakage will occur. Furthermore, if ozone blowing or ultraviolet irradiation has not been carried out over a long period of time, this increases the possibility that the degree of water decay becomes progressively worse by residual component parts. For example, when the fuel cell system has been taken out of operation for a long period of time, neither ozone blowing nor ultraviolet irradiation can be carried out, therefore producing the problem that the decay of water becomes progressively worse.

On the other hand, in accordance with the third method, both an apparatus for water recovery and an apparatus for water supply are formed of material having an antibacterial action. This makes it possible to effectively preventing the recovered water from decaying. However, since the elution of antibacterial component parts cannot be controlled, the result may be that antibacterial effects cannot be obtained as expected depending the use conditions. In addition, there is a likelihood that antibacterial effects are not exhibited at all depending on the type of bacteria. Besides, there is another problem that the load to a purifying means for recovered water purification, especially the load to an ion exchange resin, increases.

BRIEF SUMMARY OF THE INVENTION

Bearing in mind the above-described problems, the present invention was made. Accordingly, an object of the present invention is to provide an improved fuel cell system capable of avoiding the occurrence of flow path blockage due to the decay of recovered water and capable of providing a supply of water in a stable manner by ensuring that the recovered water is prevented from decaying.

In order to solve the above-described problems, the present invention provides a fuel cell system. The fuel cell system of the present invention comprises a hydrogen generator configured to generate hydrogen gas by allowing a source material to undergo a reforming reaction and a fuel cell equipped with a anode and an cathode and configured to generate electric power by allowing the hydrogen gas supplied to the anode and oxygen gas supplied to the cathode to react electrochemically with each other, and further comprises a water recovering portion configured to recover water from water vapor discharged from at least one of the fuel and cathodes, a water storing portion which is equipped with a tank for storing water recovered by the water recovering portion, and a water supply portion configured to supply water stored in the tank to the hydrogen generator, wherein the tank is configured, in order to prevent water stored in the tank from decaying, such that the stored water is dischargable to the outside, and wherein the fuel cell system is so configured as to make a decision on whether or not to discharge the stored water to the outside for the prevention of water decay.

In addition, preferably the fuel cell system of the aforesaid invention further comprises a discharge prompting information output portion configured to output, when it is decided that water stored in the tank is to be discharged outside, discharge prompting information indicative of the discharging of the stored water to the outside.

Furthermore, preferably the fuel cell system of the aforesaid invention is so configured as to make, on the basis of the accumulated operating time of the fuel cell system, a decision on whether or not to discharge the stored water to the outside.

In addition, preferably the fuel cell system of the aforesaid invention is so configured as to make, on the basis of the accumulated downtime of the fuel cell system, a decision on whether or not to discharge the stored water to the outside.

Furthermore, preferably in the fuel cell system of the aforesaid invention the water supply portion has a pump for transporting water stored in the tank, a filter, disposed between the tank and the pump, for water purification, and the fuel cell system is so configured as to make, on the basis of a flow rate of water output from the pump, a decision on whether or not to discharge the stored water to the outside.

In addition, preferably in fuel cell system of the aforesaid invention the water supply portion has a pump for transporting water stored in the tank, a filter, disposed between the tank and the pump, for water purification, and the fuel cell system is so configured as to make, on the basis of the operating state of the pump, a decision on whether or not to discharge the stored water to the outside.

Furthermore, preferably in the fuel cell system of the aforesaid invention the inside of the tank is dried after the discharging of the water stored in the tank to the outside.

In addition, preferably the fuel cell system of the aforesaid invention further comprises a heater for heating the tank, wherein the inside of the tank is dried by application of heat to the tank by the heater.

Furthermore, preferably in the fuel cell system of the aforesaid invention the heater heats the tank at a temperature within the range of 100 to 130 degrees Centigrade.

In addition, preferably in the fuel cell system of the aforesaid invention the heater heats the tank when water is stored in the tank.

Furthermore, preferably the fuel cell system of the aforesaid invention further comprises a water purifier for water purification and a cooler for cooling water heated by the heater, wherein the water supply portion supplies water cooled by the cooler to the hydrogen generator through the water purifier.

In addition, preferably in the fuel cell system of the aforesaid invention the tank is provided with an openable and closable exhaust opening so that gas generated by heating by the heater is dischargable to the outside.

Furthermore, preferably in the fuel cell system of the aforesaid invention gas discharged from the tank is supplied to the hydrogen generator.

In addition, preferably in the fuel cell system of the aforesaid invention the tank is supplied with water from the outside, and after the discharging of the stored water in the tank to the outside, the inside of the tank is cleaned by a supply of water to the tank, and thereafter the inside of the tank is dried.

Furthermore, preferably in the fuel cell system of the aforesaid invention the concentration of chlorine in the water supplied from the outside falls within the range of 0.1 to 5 mg/l.

In addition, preferably in the fuel cell system of the aforesaid invention the tank is supplied with water from the outside, and after the discharging of the stored water in the tank to the outside, the inside of the tank is cleaned by a supply of water to the tank from the outside.

Furthermore, preferably in the fuel cell system of the aforesaid invention the water storing portion has a plurality of tanks which sequentially store water, and the fuel cell system is so configured as to make a decision on whether or not to discharge water, stored in a tank of the plural tanks which is not storing water, to the outside.

In addition, preferably in the fuel cell system of the aforesaid invention the inside of the tank is dried after the discharging of the water stored in the tank to the outside.

Furthermore, preferably the fuel cell system of the aforesaid invention further comprises a heater for heating the tank, wherein the inside of the tank is dried by application of heat to the tank by the heater.

In addition, preferably the fuel cell system of the aforesaid invention further comprises a gas drawing portion for drawing gas into the tank from the outside.

Furthermore, preferably in the fuel cell system of the aforesaid invention a filter for removing solid impurity components from gas is disposed upstream of the gas drawing portion relative to the direction in which the gas flows.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Hereinafter, embodiments of the present invention will be described in detail with reference to the drawings.

Embodiment 1

Figure 1:
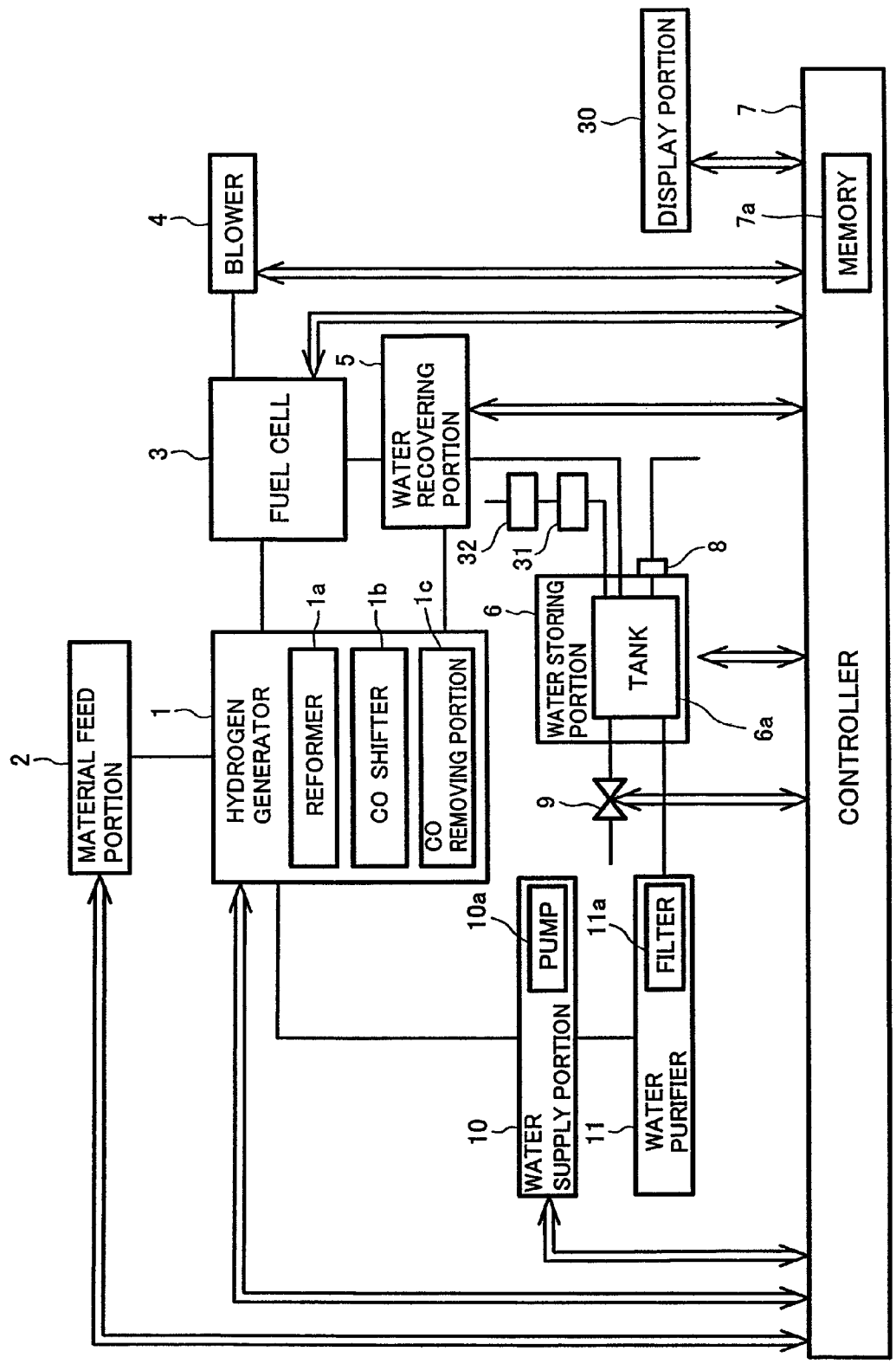
FIG. 1 is a block diagram showing a constructional arrangement of a fuel cell system according to a first embodiment of the present invention.

Referring to FIG. 1, there is shown a block diagram illustrating a constructional arrangement of a fuel cell system according to a first embodiment of the present invention. As shown in FIG. 1, the fuel cell system of the first embodiment is provided with a hydrogen generator 1 adapted to generate hydrogen gas mainly by acceleration of a reforming reaction through the use of a source material (such as a hydrocarbon component part of natural gas, LP gas et cetera, alcohol (e.g., methanol), naphtha et cetera) and water vapor. The hydrogen generator 1 is made mainly up of a reformer 1a for accelerating a reforming reaction as described above, a CO shifter 1b for reducing the concentration of carbon monoxide in hydrogen gas after a reforming reaction in the reformer 1a, and a CO removing portion 1c. And, the reformer 1a is provided with a reforming heater (not shown) which supplies the heat necessary for the reforming reaction. The reforming heater is provided with a flame burner for burning a part of the source material or for burning gas returned from where the hydrogen gas was supplied, and a sirocco fan for supplying combustion air.

The hydrogen generator 1 is connected to a material feed portion 2 which supplies the hydrogen generator 1 with a source material and to a fuel cell 3 of the proton-exchange membrane type. The material feed portion 2 receives natural gas from, for example, a gas infrastructure and supplies it to the hydrogen generator 1.

In addition, the fuel cell 3 produces electric power by making use of hydrogen gas supplied to the anode (anode) side from the hydrogen generator 1 and air supplied to the cathode (cathode) side from a blower 4. And, in the present embodiment, the fuel cell 3 is of the proton-exchange membrane type, which, however, should not in any way be deemed restrictive. The heat, produced when the fuel cell 3 generates electricity, is recovered and utilized in water heating equipment, heating equipment et cetera through an appropriate heat medium. By means of this, the fuel cell 3 functions as a cogeneration apparatus capable of generation of electric power and heat.

The fuel cell 3 is connected to a water recovering portion 5 which is made up of an air cooling fan and other components. The water recovering portion 5 recovers moisture contained in hydrogen gas discharged from the anode of the fuel cell 3 and moisture contained in air discharged from the cathode of the fuel cell 3. The water recovering portion 5 is connected to the hydrogen generator 1 and supplies hydrogen gas discharged from the anode of the fuel cell 3 to the hydrogen generator 1. Furthermore, the water recovering portion 5 is connected also to a water storing portion 6 which will be described later, and supplies water recovered in the way as descried above to the water storing portion 6.

The water storing portion 6 is provided with a tank 6a adapted to store water supplied from the water recovering portion 5. In addition, the water storing portion 6 is further provided with an openable and closable drain opening 8, thereby allowing the stored water to flow out through the drain opening 8 for the prevention of water decay, as will be described later.

And now, in order to force the water held in the tank 6a to flow out through the drain opening 8, it is necessary to draw gas into the tank 6a. To this end, the water storing portion 6 is provided with a gas drawing opening 31 for drawing gas into the tank 6a.

If gas drawn into the inside of the tank 6a through the gas drawing opening 31 contains undesirable germs and their necessary nourishment, this increases the possibility that the water held within the tank 6a decays. To cope with this, the gas drawing opening 31 is connected to a filter 32 which is disposed upstream relative to the gas flowing direction for the removal of solid contaminants contained in the gas.

Furthermore, the water storing portion 6 is in connection with a water supply valve 9 for supplying water provided from a water infrastructure into the tank 6a, so that a supply of water is provided to the tank 6a by way of the water supply valve 9 if required.

When the concentration of chlorine in the water which is supplied to the tank 6a via the water supply valve 9 is relatively low, bactericidal effects with respect to the water held in the tank 6a is weak. On the other hand, when the chlorine concentration is relatively high, pipes and constructional members of the tank 6a through which water flows undergo significant deterioration. In the light of this, preferably the concentration of chlorine in the water which is supplied to the tank 6a from the outside through the water supply valve 9 falls within the range of about 0.1 to about 5 mg/l.

The water storing portion 6 is connected to a water purifier 11 comprising a filter 11a such as an ion exchange resin, an activated carbon et cetera and to a water supply portion 10 comprising a pump 10a for water transportation. The water supply portion 10 delivers to the hydrogen generator 1 the water supplied from the water storing portion 6 through the water purifier 11. The water thus supplied will be used for a reforming reaction in the hydrogen generator 1.

In the present embodiment, the water held in the water storing portion 6 is used for a reforming reaction; however, it may be used for humidification of fuel gas or oxidant gas or in other water utilizing means.

Furthermore, the fuel cell system of the present embodiment is further provided with a display portion 30 which displays discharge prompting information requesting the user or maintenance service provider to discharge the water held in the tank 6a from the drain opening 8. The display portion 30 is formed by a liquid crystal display or by a light emitting diode. For the case of the fuel cell system of the present embodiment, the user visually acquires such a discharge prompting information message, which, however, should not in any way be deemed restrictive. For example, the discharge prompting information is outputted outside in the form of a voice message, thereby allowing the user to acoustically acquire the information.

The foregoing units, namely the hydrogen generator 1, the material feed portion 2, the fuel cell 3, the blower 4, the water recovering portion 5, the water storing portion 6, the water supply valve 9, the water supply portion 10, and the display portion 30, are all connected to a controller 7, and each unit operates in response to a control signal outputted from the controller 7.

The controller 7 is provided with a memory 7a having a predetermined storage area. The memory 7a stores programs that the controller 7 executes and various data.

Next, the operation of the fuel cell system of the first embodiment of the present invention having the above-described configuration will be described below.

The reformer 1a of the hydrogen generator 1 performs a reforming reaction of converting a natural gas supplied from the material feed portion 2 and water supplied from the water supply portion 10 in the way as will be describe below, into hydrogen and carbon dioxide. In order to achieve the acceleration of a reforming reaction, heating is carried out by the reforming heating part during the reforming reaction. And, in order to reduce the concentration of carbon monoxide contained in hydrogen gas, a transformation reaction for allowing CO to react with water is carried out in the CO shifter 1b. In addition, for the purpose of reducing the carbon monoxide concentration, a selective oxidation reaction is carried out in the CO removing portion 1c by addition of air. Hydrogen gas is generated after the aforesaid reforming, transformation, selective oxidation reactions.

The hydrogen generator 1 supplies the hydrogen gas thus generated to the anode side of the fuel cell 3. Meanwhile, the blower 4 supplies a stream of air to the cathode side of the fuel cell 3. Alternatively, it may be arranged such that the blower 4 supplies air humidified in the water recovering portion 5 to the fuel cell 3.

The fuel cell 3 generates water and electric power by allowing hydrogen gas supplied to the anode side from the hydrogen generator 1 and oxygen contained in air supplied to the cathode side from the blower 4 to react electrochemically with each other.

In addition, in the fuel cell 3, hydrogen gas is discharged from the anode while air is discharged from the cathode. As described above, the discharged hydrogen gas and air contain water produced when generating electric power. The water recovering portion 5 recovers moisture contained in the hydrogen gas and air discharged from the fuel cell 3 and condenses the recovered moisture for delivery to the water storing portion 6.

Furthermore, after recovering moisture from hydrogen gas discharged from the anode, the water recovering portion 5 supplies the hydrogen gas to the hydrogen generator 1. The hydrogen gas thus supplied to the hydrogen generator 1 is used as a heat source in the reforming heating part of the reformer 1a of the hydrogen generator 1.

Instead of employing the aforesaid arrangement of supplying hydrogen gas discharged from the anode through the water recovering portion 5 to the hydrogen generator 1, another arrangement may be employed in which hydrogen gas is supplied directly to the hydrogen generator 1 from the fuel cell 3 so that it is utilized as a heat source for the reforming heating part. In this arrangement, the hydrogen gas utilized by the reforming heating part is supplied to the water recovering portion 5 for moisture recovery.

In the water storing portion 6, water delivered from the water recovering portion 5 is stored in the tank 6a. The water thus stored in the tank 6a is supplied, through the water purifier 11, to the water supply portion 10. The water supply portion 10 transports the water to the hydrogen generator 1 by the action of the pump 10a. In this way, the water delivered from the water supply portion 10 is used for a reforming reaction in the reformer 1a of the hydrogen generator 1.

As has been described above, the water discharged from the fuel cell 3 is recovered by the water recovering portion 5. Thereafter, the water is stored in the tank 6a of the water storing portion 6 and then is supplied, through the water purifier 11 and through the water supply portion 10, to the hydrogen generator 1. Here, the possibility that the water recovered in the inside of the fuel cell system decays is high because it contains no antibacterial component parts such as chlorine component parts. For example, undesirable germs and their necessary nourishment contained in the air discharged from the cathode may often remain intact in the recovered water, and the recovered water consequently decays. This causes flow path blockage or other trouble in a water collecting construction or in a water supply construction, thereby producing water supply problems. In order to prevent the problems, in the fuel cell system of the present embodiment, the user or maintenance service provider is warned to discharge the water stored in the tank 6a of the water tank 6 from the drain opening 8 in the following way.

Figure 2:
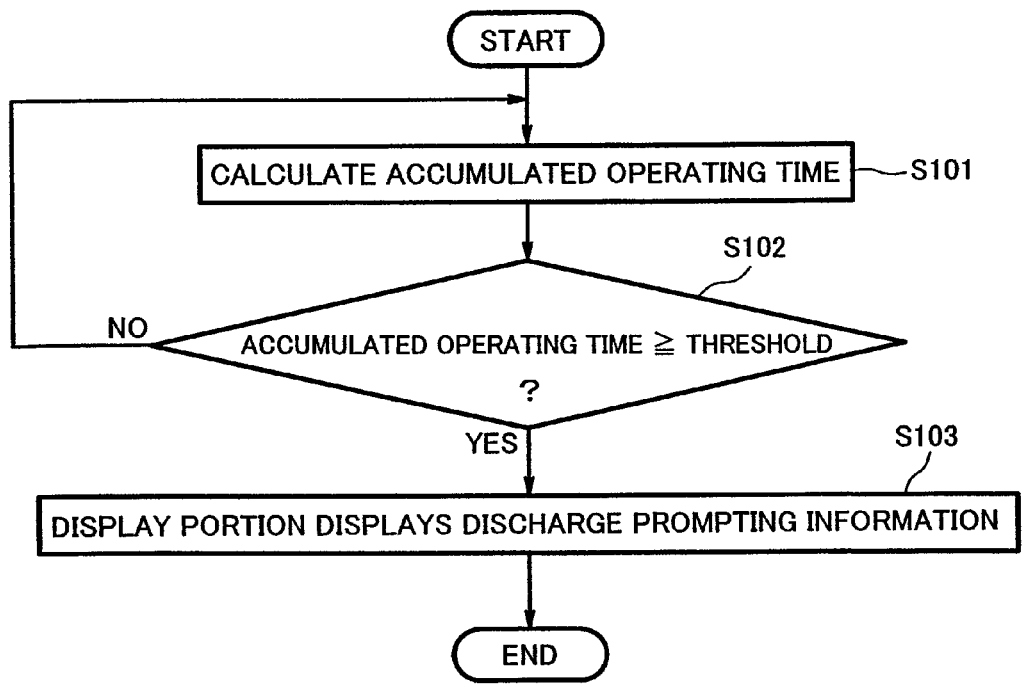
FIG. 2 is a flow chart showing steps of a procedure of a controller of the fuel cell system of the first embodiment of the present invention.

FIG. 2 is a flow chart showing steps of a procedure of the controller 7 of the fuel cell system of the first embodiment of the present invention.

The controller 7 finds the accumulated operating time of the fuel cell system, i.e., the accumulated time of the operation of the fuel cell system since the moment that the water stored in the tank 6a was discharged. In the present embodiment, the accumulated time of the operation of the reformer 1a of the hydrogen generator 1 since the moment that the water stored in the tank 6a was discharged serves as the accumulated operating time of the fuel cell system.

The controller 7 monitors the operating state of the hydrogen generator 1 and stores, in the memory 7a, data indicative of the operation start time of the reformer 1a, data indicative of the operation stop time of the reformer 1a, and data indicative of the time that the water stored in the tank 6a was last discharged. And, the controller 7 calculates, at appropriate timing, the accumulated operating time of the fuel cell system (hereinafter referred to just as the accumulated operating time) by making use of the data stored in the memory 7a (S101).

Next, the controller 7 decides whether or not the accumulated operating time $\geq$ a predetermined threshold (S102). The threshold is set such that the amount of undesirable germs present in the water stored in the tank 6a will not exceed a predetermined value. Here, the predetermined value is approximately an amount of germs at which algae is liable to grow in the tank 6a. The predetermined value is for example about 105 germs/ml.

The accumulated operating time taken for the amount of germs contained in the water held in the tank 6a to exceed the predetermine value varies depending on the operating condition of the blower 4 (e.g., the output of the blower 4) during the normal operation of the fuel cell system and depending on the system configuration. Accordingly, the threshold used in the present embodiment is determined appropriately so as to range, for example, between about 72 and about 96 hours on the basis of the operating condition and on the basis of the system configuration.

If in Step S102 it is decided that the accumulated operating time is less than the threshold (in other words, the result of Step S102 is "NO"), the controller 7 returns to Step S101 and continues processing. On the other hand, if in Step S102 it is decided that the accumulated operating time is equal to or greater than the threshold (in other words, the result of Step S102 is "YES"), then the controller 7 issues an instruction that requests the display portion 30 to display discharge prompting information (S103). In response to the instruction, the display portion 30 displays the message requested.

In the fuel cell system of the present embodiment, as the accumulated operating time increases, the amount of undesirable germs in the water held in the tank 6a increases. Accordingly, when the accumulated operating time exceeds a predetermined value, the controller 7 decides that the water should be drained and, in order to draw the user's or maintenance service provider's attention to the discharging of the water, the display portion 30 displays discharge prompting information.

The user or maintenance service provider places the drain opening 8 in the open state in response to the discharge prompting information displayed on the display portion 30. As a result, the water held in the tank 6a is discharged through the drain opening 8. This makes it possible to prevent the water stored in the tank 6a from decaying.

In the present embodiment, the drain opening 8 is placed in the open state by the user or maintenance service provider in order that the water in the tank 6a may be discharged. However, an alternative arrangement may be made as follows. More specifically, the controller 7 is configured so that it can control the opening/closing state of the drain opening 8. The controller 7 automatically places the drain opening 8 in the open state if Step S102 decides that the accumulated operating time≧the threshold value. In this way, the water held in the tank 6a is discharged. In this case, the display portion 30 no longer needs to display discharge prompting information.

In addition, in the present embodiment, the water recovering portion 5 recovers both moisture contained in the hydrogen gas discharged from the fuel cell 3 and moisture contained in the air supplied from the blower 4; however, it may be arranged such that either one of the former and the latter is recovered by the water recovering portion 5. In the case where the water recovering portion 5 recovers moisture contained in the hydrogen gas and moisture contained in the air or in the case where the water recovering portion 5 recovers only moisture contained in air supplied to the cathode side from the blower 4, the accumulated time of air supply from the blower 4 to the cathode side since the moment that the water held in the tank 6 was drained may serve as the accumulated operating time, the reason for which is that it is reasonable that the accumulated time of air supply to the cathode side is used as the time used to determine the timing of the discharging of water for the purpose of water decay prevention, because undesirable germs and their necessary nourishment are contained in the air supplied to the cathode side from the blower 4, as described above.

Embodiment 2

The fuel cell system of the first embodiment is so configured as to decide whether or not to discharge the water in the tank on the basis of the accumulated operating time of the fuel cell system. On the contrary, a second embodiment of the present invention provides a fuel cell system configured to decide whether or not to discharge the water held in the tank on the basis of the accumulated downtime of the fuel cell system which is the accumulated downtime of the fuel cell system since the moment that the water stored in the tank was last drained.

In the present embodiment, the accumulated downtime of the reformer of the hydrogen generator since the moment that the water held in the tank was last drained serves as the accumulated down time of the fuel cell system.

The fuel cell system of the second embodiment is identical in configuration with the fuel cell system of the first embodiment. Accordingly, the description of the fuel cell system of the second embodiment is omitted.

Hereinafter, with reference to FIG. 1 and a flow chart, the operation of the fuel cell system of the present embodiment will be described.

Figure 3:
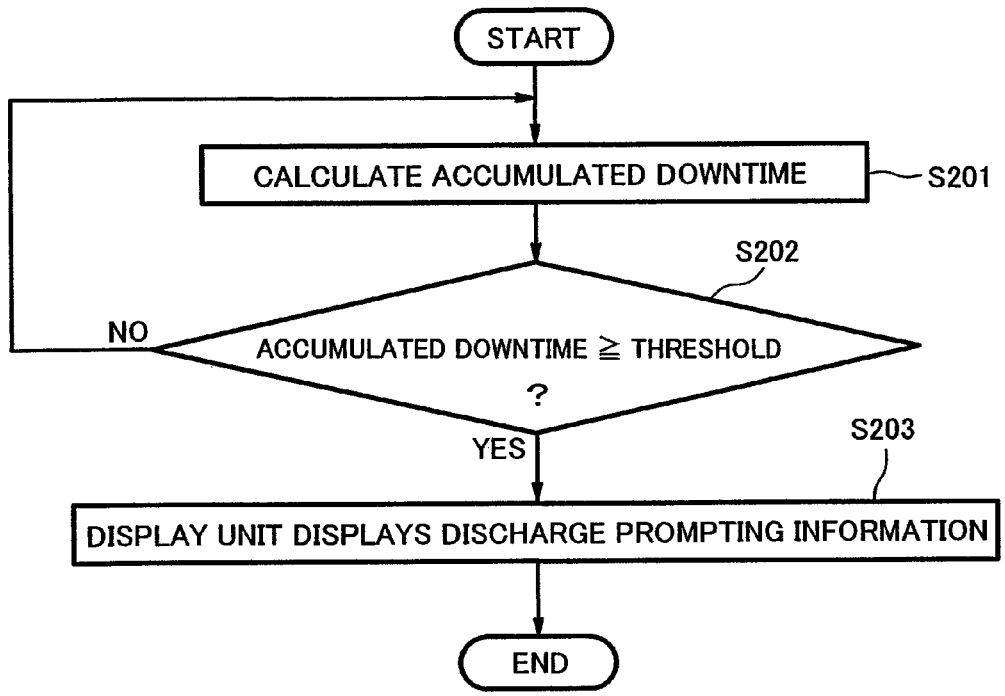
FIG. 3 is a flow chart showing steps of a procedure of a controller of a fuel cell system according to a second embodiment of the present invention.

Referring to FIG. 3, there is shown a flow chart illustrating steps of a procedure of the controller 7 of the fuel cell electric power generating of the second embodiment of the present invention.

The controller 7 monitors the operation state of the hydrogen generator 1. The memory 7a stores data indicative of the operation start time of the reformer 1a, data indicative of the operation stop time of the reformer 1a, and data indicative of the time that the water held in the tank 6a was last drained. And, the controller 7 calculates, at appropriate timing, the accumulated downtime of the fuel cell system (hereinafter referred to just as the accumulated downtime) by making use of the data stored in the memory 7a (S201).

Next, the controller 7 decides whether or not the accumulated downtime found≧a predetermined threshold (S202). The threshold is set such that the amount of undesirable germs present in the water stored in the tank 6a will not exceed a predetermined value. Here, the predetermined value is approximately an amount of undesirable germs at which algae is liable to grow. The predetermined value is for example about 105 germs/ml, as in the case of the first embodiment.

The accumulated downtime taken for the amount of undesirable germs contained in the water held in the tank 6a to exceed the predetermine value varies depending on the temperature of the inside of the tank 6a. Accordingly, the threshold used in the present embodiment is determined appropriately so as to normally range between about 24 and about 40 degrees Centigrade on the basis of the temperature of the inside of the tank 6a out of operation.

For example, for the case of water which contains an amount of undesirable germs (=103 germs/ml), when left to stand at 25 degrees Centigrade for 48 hours, the amount will increase up to 105 germs/ml. From this, preferably the threshold of the present embodiment is so set as to fall in the range of from about 24 hours to about 72 hours.

By comparison, the threshold of the first embodiment is greater than the threshold of the second embodiment, the reason for which is as follows. Since the temperature of the water in the tank 6a is about 70 degrees Centigrade during the system operation period, this condition disrupts the habitat of undesirable germs in comparison with the system downtime period. Besides, the water in the tank 6a is consumed constantly because there is the need for a supply of water vapor to the hydrogen generator 1 from the water storing portion 6. Therefore, the growth rate, at which the amount of undesirable germs increases, is less than that during the system operating period.

If in Step S202 it is decided that the accumulated downtime is less than the threshold (in other words, the result of Step S202 is "NO"), the controller 7 returns to Step S201 and continues processing. On the other hand, if in Step S202 it is decided that the accumulated downtime is equal to or greater than the threshold (in other words, the result of Step S202 is "YES"), the controller 7 issues an instruction that requests the display portion 30 to display discharge prompting information (S203). In response to the instruction, the display portion 30 displays the message requested.

In the fuel cell system of the present embodiment, as the accumulated downtime increases, the amount of undesirable germs contained in the water held in the tank 6a increases. Accordingly, when the accumulated downtime exceeds the predetermined value, the controller 7 decides that the water should be drained and, in order to draw the user's or maintenance service provider's attention to the discharging of the water, the display portion 30 display discharge prompting information.

The user or maintenance service provider places the drain opening 8 in the open state in response to the discharge prompting information displayed on the display portion 30. As a result, the water held in the tank 6a is drained through the drain opening 8. This makes it possible to prevent the water stored in the inside of the tank 6a from decaying.

In addition, in the case where the fuel cell system is activated after the water held in the tank 6a was drained during the system downtime period, water is supplied into the tank 6a from a water infrastructure by the controller 7 placing the water supply valve 9 in the open state. This enables the fuel cell system to be activated quickly.

Embodiment 3

A fuel cell system formed in accordance with a third embodiment of the present invention is so configured as to decide whether or not to discharge the water held in the tank on the basis of the flow rate of the water output from the pump of the water supply portion.

Figure 4:
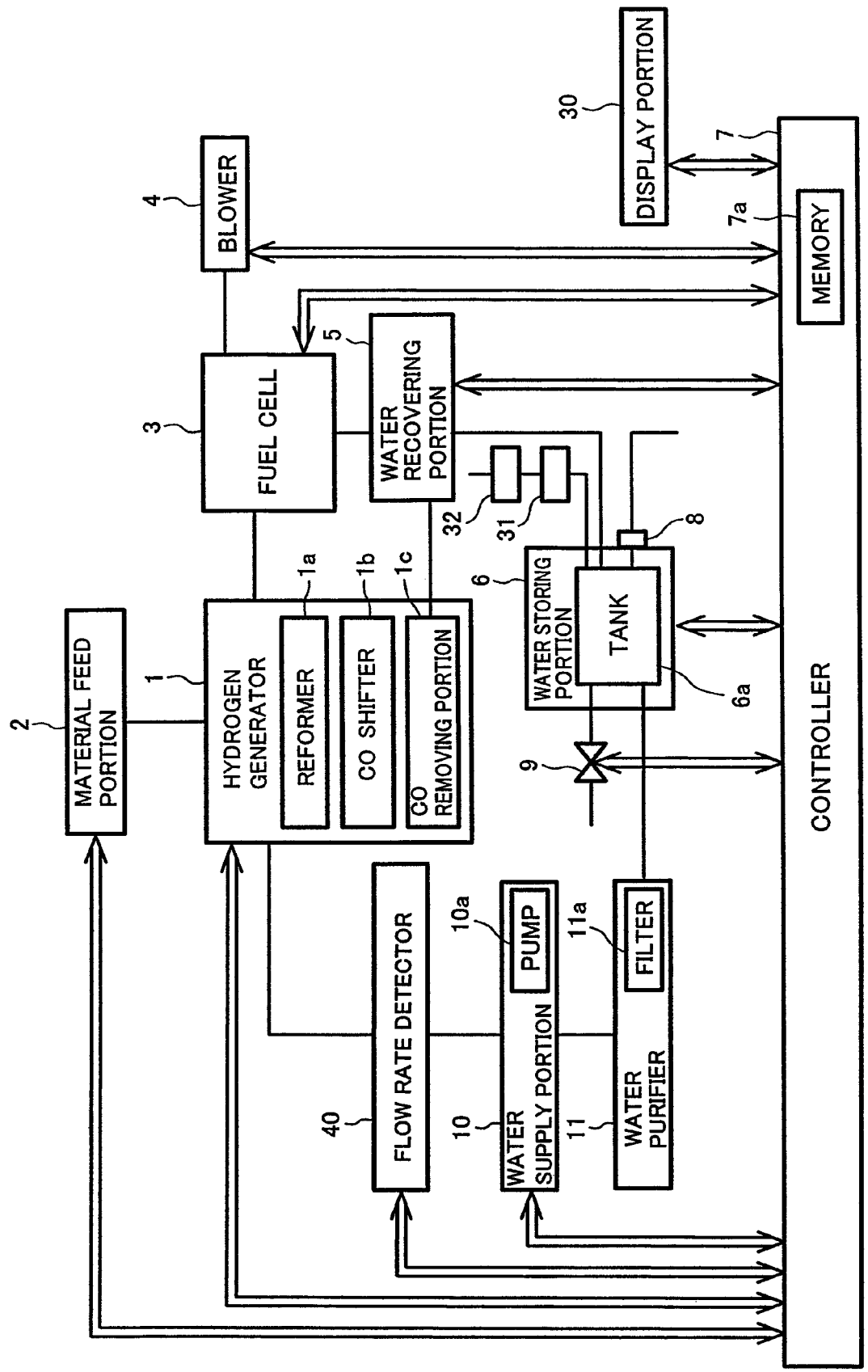
FIG. 4 is a block diagram showing a constructional arrangement of a fuel cell system according to a third embodiment of the present invention.

Referring to FIG. 4, there is shown a block diagram illustrating a constructional arrangement of the fuel cell system according to the third embodiment of the present invention. As shown in FIG. 4, in the fuel cell system of the present embodiment, a flow rate detector 40 for detecting the flow rate of water per unit time is disposed downstream of the water supply portion 10 relative to the direction in which the water flows. The flow rate detector 40 is connected in communicable manner with the controller 7. The flow rate detector 40 outputs a signal (hereinafter called the flow rate detection signal) indicative of a detected value of the flow rate of the water output from the water supply portion 10, to the controller 7. Based on the flow rate detection signal, the controller 7 instructs the display portion 30 to display discharge prompting information in the way described later.

With respect to other constructional components, the fuel cell system of the present embodiment and the fuel cell system of the first embodiment are substantially the same. Accordingly, they are assigned the same reference numerals and their description is omitted.

Next, the operation of the fuel cell system of the present embodiment constructed in the way as described above will be discussed.

During the operating period, the controller 7 brings the pump 10a of the water supply portion 10 to operate under predetermined operating conditions. In this case, since the operation of the pump 10a is constant, the flow rate of the water output from the pump 10a increases or decreases according to the increase or decrease in the flow rate of the water which is supplied to the water supply portion 10 through the water purifier 11.

In the controller 7, the memory 7a pre-stores data indicative of a reference value of the flow rate of the water output from the pump 10a of the water supply portion 10. The reference value is set on the assumption of the flow rate of the water output from the pump 10a when water flowing from the tank 6a passes through the filter 11a in a normal state prior to the occurrence of clogging of the filter 11a of the water purifier 11 caused by undesirable germs.

When undesirable germs cause clogging of the filter 11a of the water purifier 11, the flow rate of the water past the filter 11a decreases, and the flow rate of the water output from the pump 10a of the water supply portion 10 likewise decreases. When the filter 11a of the water purifier 11 becomes clogged by germs, the detected value of the flow rate of the water output from the pump 10a of the water supply portion 10 is less than the reference value. Therefore, from the fact that the detected value of the flow rate of the water output from the pump 10a of the water supply portion 10 is less than the reference value, the filter 11a of the water supply portion 11 can be concluded to suffer from clogging by germs.

Figure 5:
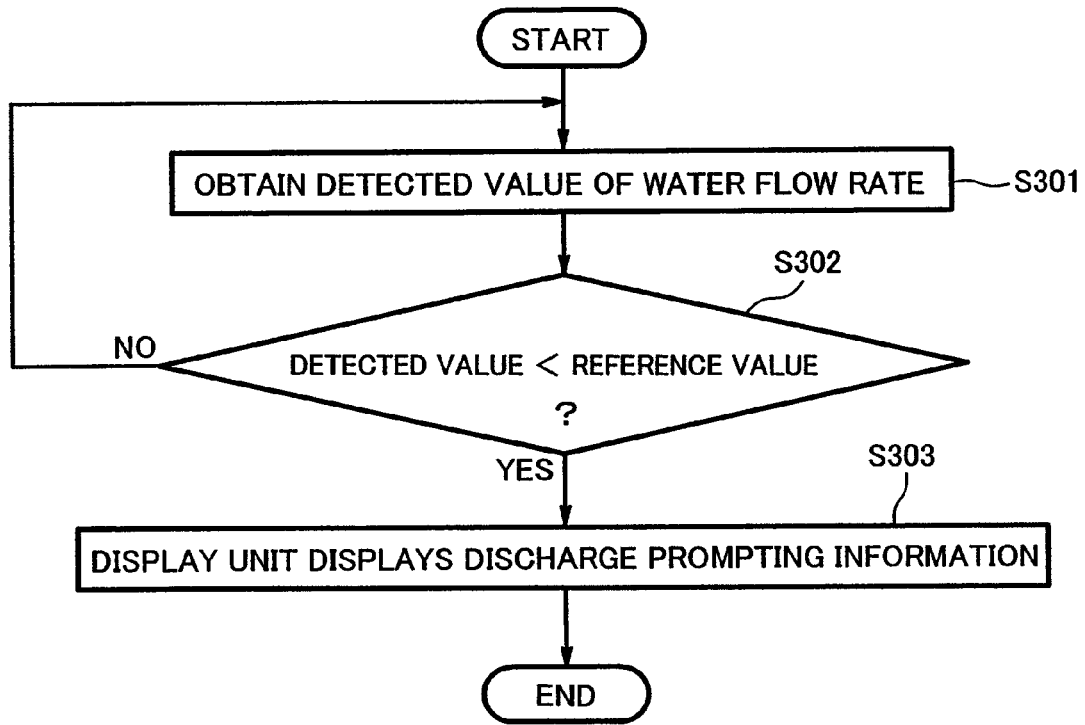
FIG. 5 is a flow chart showing steps of a procedure of a controller of the fuel cell system of the third embodiment of the present invention.

Referring to FIG. 5, there is shown a flow chart illustrating steps of a procedure of the controller 7 of the fuel cell system formed in accordance with the third embodiment of the present invention.

The controller 7 receives, at appropriate timing, a flow rate detection signal from the flow rate detector 40. Based on the flow rate detection signal received, the controller 7 obtains a detected value of the flow rate of the water output from the pump of the water supply portion 10 (S301).

Next, the controller 7 makes a decision on whether or not the detected value obtained falls below the reference value stored in the memory 7a (S302). If the detected value is determined to be equal to or greater than the reference value (in other words, the result of Step S302 is "NO"), then the controller 7 returns to Step S301 and continues processing. On the other hand, if the detected value is determined to be less than the reference value (in other words, the result of Step S302 is "YES"), then the controller 7 issues an instruction that requests the display portion 30 to display discharge prompting information (S303). In response to the instruction, the display portion 30 displays the message requested.

In the fuel cell system of the present embodiment, with the increase in the accumulated operating time, the amount of undesirable germs collected in the filter 11a of the water purifier 11 likewise increases. When the filter 11a becomes clogged by germs, it can be judged that the accumulated operating time is considerably great and there is a considerable increase in the amount of undesirable germs present in the water held in the tank 6a. Accordingly, if it is concluded that the filter 11a of the water purifier 11 becomes clogged by germs because the detected value of the flow rate of the water falls below the reference value, discharge prompting information is displayed on the display portion 30 in order to draw the user's or maintenance service provider's attention to the discharging of the water held in the tank 6a.

The user or maintenance service provider places the drain opening 8 in the open state in response to the discharge prompting information displayed on the display portion 30. As a result, the water held in the tank 6a is drained through the drain opening 8. This makes it possible to prevent the water stored in the tank 6a from decaying.

In addition, it may be arranged such that the controller 7 controls the operation of the pump 10a of the water supply portion 10 so that the pump 10a rotates in the opposite direction, at the time when instructing the display portion 30 to display discharge prompting information or before or after it. Because of this, germs, the cause of clogging of the filter 11a of the water purifier 11, are brought back to the tank 6a. The germs thus brought back to the tank 6a are discarded outside when the water held in the tank 6a is drained.

Embodiment 4

A fuel cell system formed in accordance with a fourth embodiment of the present invention is so configured as to decide whether or not to discharge the water held in the tank on the basis of the operating state of the water supply portion.

Since the configuration of the fuel cell system of the fourth embodiment is substantially the same as that of the fuel cell system of the third embodiment, the description thereof is omitted. Hereinafter, referring to FIG. 4, the operation of the fuel cell system according to the fourth embodiment will be described.

In the present embodiment, during the operating period, the controller 7 controls the operation of the pump 10a of the water supply portion 10 so that the pump 10a delivers water at a predetermined flow rate. In this case, the workload of the pump 10a of the water supply portion 10 increases or decreases according to the increase or decrease in the flow rate of water which is supplied to the water supply unit 10 through the water purifier 11.

The memory 7a of the controller 7 pre-stores data indicative of a reference value of the flow rate of water output from the pump 10a of the water supply portion 10. As in the foregoing case, the reference value is set on the assumption of the flow rate of water output from the pump 10a when water flowing from the tank 6a passes through the filter 11a in a normal state prior to the occurrence of clogging of the filter 11a of the water purifier 11 caused by undesirable germs.

In addition, the memory 7a of the controller 7 pre-stores data indicative of the workload of the pump 10a (hereinafter referred to as the reference workload) required for the delivery of water at a rate of flow according to the reference value. And, based on the flow rate detection signal outputted from the flow rate detector 40, the controller 7 obtains a detected value of the flow rate of the water delivered by the pump 10a and then makes a comparison between the detected value and the reference value. If the detected value is found to fall below the reference value, then the workload of the pump 10a is increased. On the other hand, if the detected value is found to exceed the reference value, then the workload of the pump 10a is decreased.

Since the rate of flow of the water past the filter 11a of the water purifier 11 decreases when the filter 11a becomes clogged by germs, the workload of the pump 10a of the water supply portion 10 becomes greater than the reference workload in order to deliver water at a rate of flow according to the reference value. Accordingly, if the workload of the pump 10a of the water supply portion 10 exceeds the reference workload, then it can be concluded that the filter 11a of the water purifier 11 becomes clogged by germs.

In the third embodiment the operation of the pump 10a of the water supply portion 10 is made constant. Also by the arrangement that the flow rate of the water delivered by the pump 10a is made constant, it can be concluded that the filter 11a of the water purifier 11 becomes clogged by germs, in the same way as described above.

The workload of the pump 10a can be measured by input energy to the pump 10a or by energy consumed by the pump 10a. Accordingly, the workload of the pump 10a can be measured by detecting an input voltage or power to the pump 10a or by detecting an amount of power consumed by the pump 10a.

The detection of input energy to the pump 10a or the detection of energy consumed by the pump 10a may be carried out by the controller 7. Alternatively, such detection may be carried out by a separately-provided, dedicated detecting means.

Figure 6:
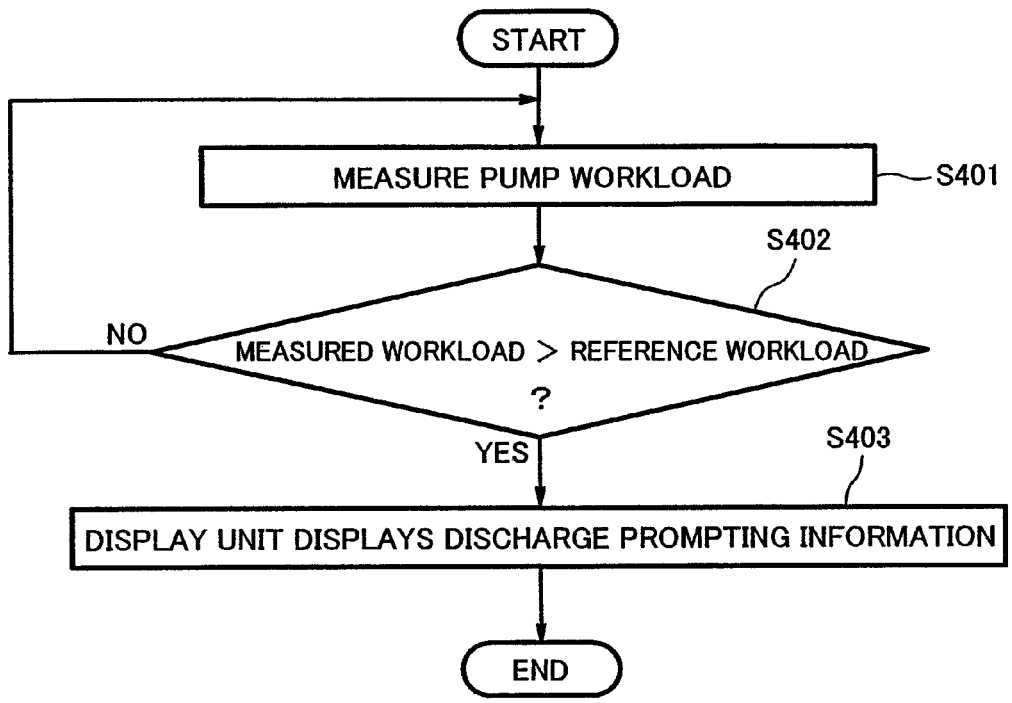
FIG. 6 is a flow chart showing steps of a procedure of a controller 7 of a fuel cell system according to a fourth embodiment of the present invention.

Referring to FIG. 6, there is shown a flow chart illustrating steps of a procedure of the controller 7 of the fuel cell system of the fourth embodiment of the present invention.

The controller 7 measures, at appropriate timing, the workload of the pump 10a of the water supply portion 10 (S401).

Next, the controller 7 decides whether or not a measured workload of the pump 10a (hereinafter referred to as the measured workload) exceeds the reference workload stored in the memory 7a (S402). If it is decided that the measured workload is equal to or less than the reference workload (in other words, the result of Step S402 is "NO"), then the controller 7 returns to Step S401 and continues processing. On the other hand, if in Step S402 it is decided that the measured workload exceeds the reference workload (in other words, the result of Step S402 is "YES"), then the controller 7 issues an instruction that requests the display portion 30 to display discharge prompting information (S403). In response to the instruction, the display portion 30 displays the message requested.

In the fuel cell system of the present embodiment, with the increase in the accumulated operating time, the amount of undesirable germs collected in the filter 11a of the water purifier 11 likewise increases. When the filter 11a becomes clogged by germs, it can be judged that the accumulated operating time is considerably great and there is a considerable increase in the amount of germs present in the water held in the tank 6a. Accordingly, if it is concluded that the filter 11a of the water purifier 11 becomes clogged by germs because the measured workload of the pump 10a exceeds the reference workload, discharge prompting information is displayed on the display portion 30 in order to draw the user's or maintenance service provider's attention to the discharging of the water held in the tank 6a.

Consequently, the water held in the tank 6a is drained through the drain opening 8 by the user or maintenance service provider. This makes it possible to prevent the water stored in the inside of the tank 6a from decaying.

In addition, as in the case of the third embodiment, it may be arranged such that the controller 7 controls the operation of the pump 10a of the water supply portion 10 so that the pump 10a rotates in the opposite direction at the time when instructing the display portion 30 to display discharge prompting information or before or after it.

Embodiment 5

A fuel cell system formed in accordance with a fifth embodiment of the present invention is so configured as to decide whether or not to discharge the water held in the tank on the basis of the operating state of the water supply portion, as in the case of the fourth embodiment.

Figure 7:
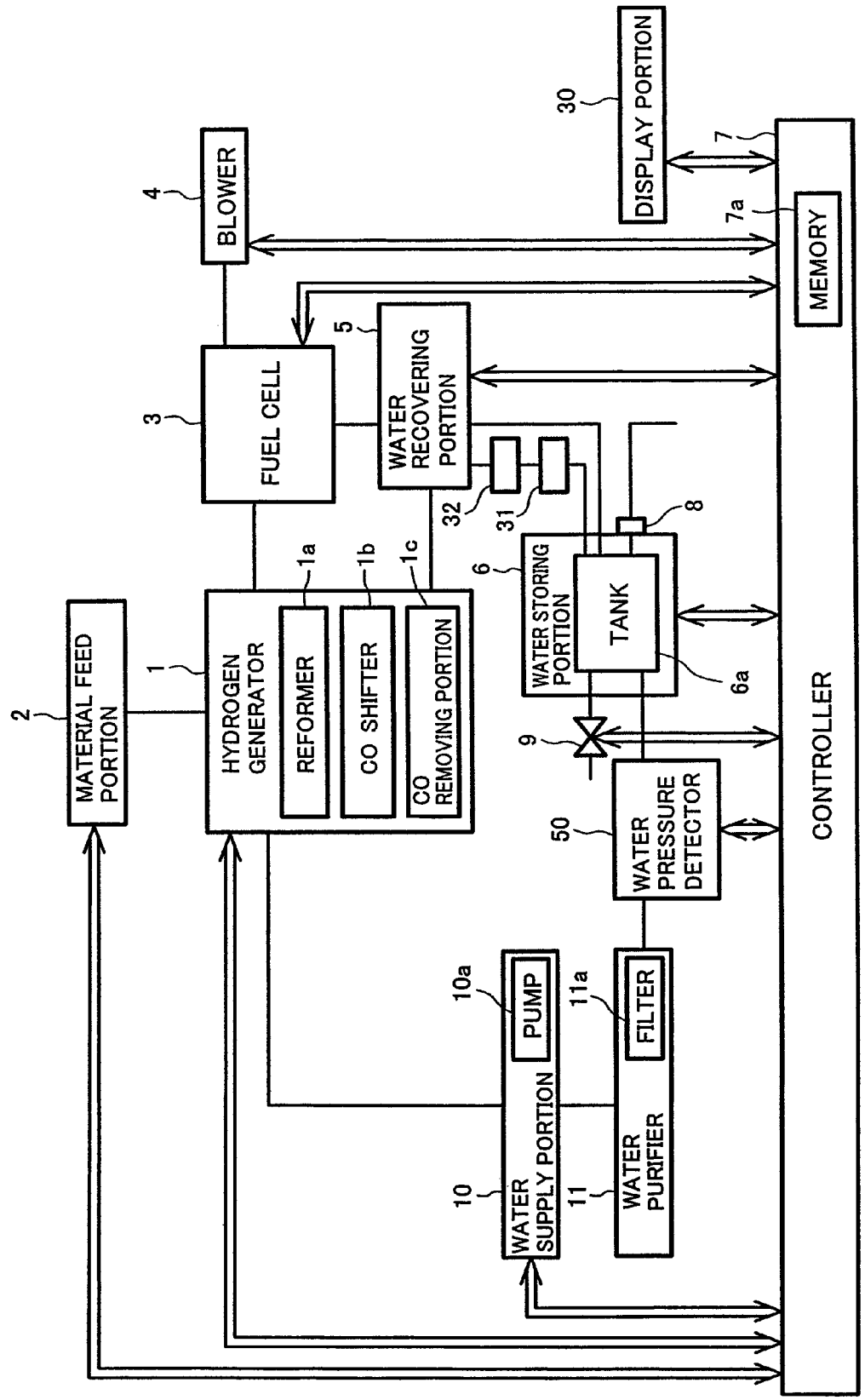
FIG. 7 is a block diagram showing a constructional arrangement of a fuel cell system according to a fifth embodiment of the present invention.

Referring to FIG. 7, there is shown a block diagram illustrating a constructional arrangement of the fuel cell system according to the fifth embodiment of the present invention. As shown in FIG. 7, the fuel cell system of the present embodiment is provided with a water pressure detector 50 for detecting the pressure of water flowing between the water storing portion 6 and the water purifier 11. The water pressure detector 50 is connected in communicable manner with the controller 7. The water pressure detector 50 outputs a signal (hereinafter called the water pressure detection signal) indicative of a detected value of the pressure of water flowing between the water storing portion 6 and the water purifier 11, to the controller 7. Based on the water pressure detection signal, the controller 7 instructs the display portion 30 to display discharge prompting information as will be described later.

With respect to other constructional components, the fuel cell system of the present embodiment and the fuel cell system of the first embodiment are substantially the same. Accordingly, they are assigned the same reference numerals and their description is omitted.

Next, the operation of the fuel cell system of the present embodiment constructed in the way as described above will be discussed.

In the case of the present embodiment, during the operating period, the controller 7 brings the pump 10a of the water supply portion 10 to operate in such a way that the detected value of the pressure of water flowing between the water storing portion 6 and the water purifier 11 equals the reference value. Data indicative of the reference value is pre-stored in the memory 7a. The reference value is set on the assumption of the pressure of water flowing between the water storing portion 6 and the water purifier 11 in a normal state prior to the occurrence of clogging of the filter 11a of the water purifier 11 due to germs.

In addition, the memory 7a of the controller 7 pre-stores data indicative of the workload of the pump 10a necessary for making the pressure of water flowing between the water storing portion 6 and the water purifier 11 equal to the reference value (hereinafter referred to as the reference workload). And, based on the water pressure detection signal outputted from the water pressure detector 50, the controller 7 obtains a detected value of the pressure of water flowing between the water storing portion 6 and the water purifier 11 and makes a comparison between the detected value and the reference value. If the detected value is found to exceed the reference value, then the workload of the pump 10a is increased. On the other hand, if the detected value is found to fall below the reference value, then the workload of the pump 10a is decreased.

The flow rate of the water past the filter 11a of the water purifier 11 decreases when the filter 11a becomes clogged by germs. Accordingly, the velocity of flow of the water between the water storing portion 6 and water purifier 11 decreases and, at the same time, the pressure of the water between the water storing portion 6 and the water purifier 11 increases. As a result, the detected value of the water pressure exceeds the reference value. In order to make the detected value agree with the reference value, the controller 7 increases the workload of the pump 10a. This increases the flow rate of the water passing through the filter 11a, and the velocity of flow of the water between the water storing portion 6 and the water purifier 11 increases and, at the same time, the pressure of the water between the water storing portion 6 and the water purifier 11 decreases. In this case, the workload of the pump 10a exceeds the reference workload.

Therefore, if the workload of the pump 10a of the water supply portion 10 exceeds the reference workload, then it can be concluded that the filter 11a of the water purifier 11 becomes clogged by germs.

The workload of the pump 10a is measured by input energy to the pump 10a or by energy consumed by the pump 10a, as in the case of the fourth embodiment.

The detection of input energy to the pump 10a or the detection of energy consumed by the pump 10a may be carried out by the controller 7, as in the case of the fourth embodiment. Alternatively, such detection may be carried out by a separately-provided, dedicated detecting means.

The procedure steps of the fuel cell system according to the fifth embodiment of the present invention are the same as the procedure steps of the fourth embodiment. More specifically, as illustrated in the flow chart shown in FIG. 6, the controller 7 measures, at appropriate manner, the workload of the pump 10a of the water supply portion 10 (S401) and make a decision on whether or not the measured workload of the pump 10a exceeds the reference workload (S402). If it is decided that the measured workload falls below the reference workload (in other words, the result of Step S402 is "NO"), then the controller 7 returns to Step S401 and continues processing. On the other hand, if in Step S402 it is decided that the measured workload is found to exceed the reference workload (in other words, the result of Step S402 is "YES"), then the controller 7 issues an instruction that requests the display portion 30 to display discharge prompting information (S403). In response to the instruction, the display portion 30 displays the message requested.

In the fuel cell system of the present embodiment, with the increase in the accumulated operating time, the amount of germs collected in the filter 11a of the water purifier 11 likewise increases. When the filter 11a becomes clogged by germs, it can be judged that the accumulated operating time is considerably great and there is a considerable increase in the amount of germs present in the water held in the tank 6a. Accordingly, if it is concluded that the filter 11a of the water purifier 11 becomes clogged by germs because the measured workload of the pump 10a exceeds the reference workload as described above, then discharge prompting information is displayed on the display portion 30 in order to draw the user's or maintenance service provider's attention to the discharging of the water held in the tank 6a.

Consequently, the water held in the tank 6a is drained through the drain opening 8 by the user or maintenance service provider. This makes it possible to prevent the water stored in the inside of the tank 6a from decaying.

As in the case of the third embodiment, it may be arranged such that the controller 7 controls the operation of the pump 10a of the water supply portion 10 so that the pump 10a rotates in the opposite direction at the time when instructing the display portion 30 to display discharge prompting information or before or after it.

Embodiment 6

In the fuel cell systems according to the first to fifth embodiments, discharge prompting information is outputted at appropriate timing in order to prompt the user or maintenance service provider to discharge the water in the tank. As a result, the tank water is discharged through the drain opening, thereby preventing the water held in the tank from decaying.

A fuel cell system according to a sixth embodiment of the present invention is capable of cleaning the inside of the tank by providing a supply of water into the tank from the outside after the discharging of the water in the tank in the way as described above.

The configuration of the fuel cell system of the sixth embodiment is substantially the same as that of the fuel cell system of the first embodiment and the description thereof is omitted accordingly.

Hereinafter, referring to FIG. 1 and a flow chart, the operation of the fuel cell system of the present embodiment will be described.

Figure 8:
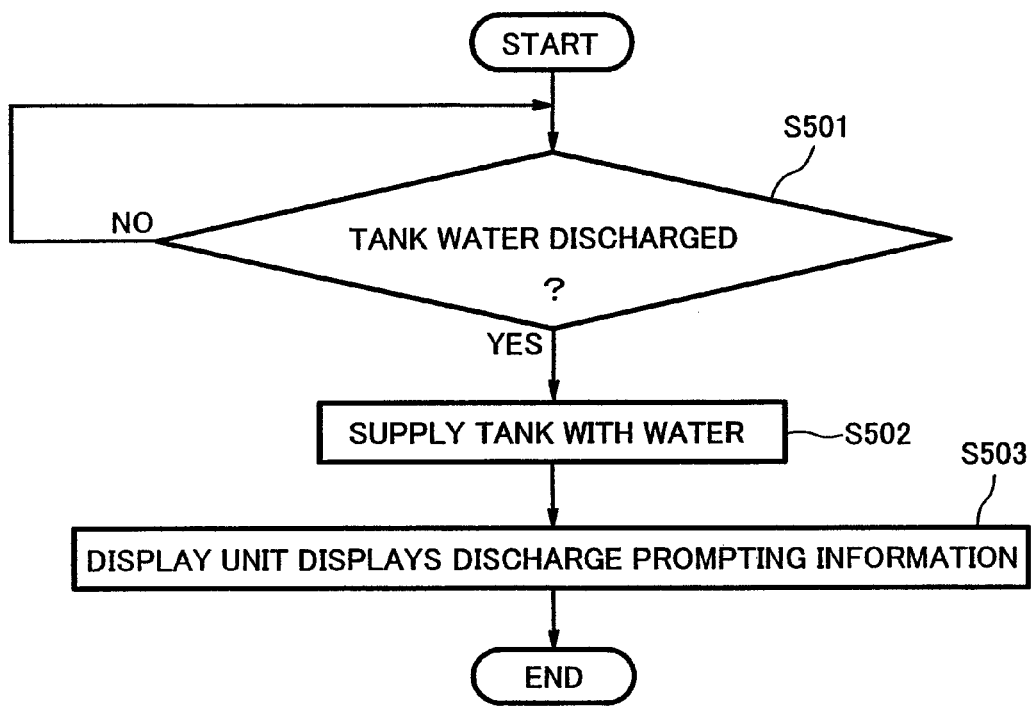
FIG. 8 is a flow chart showing steps of a procedure of a controller of a fuel cell system according to a sixth embodiment of the present invention.

FIG. 8 is a flow chart showing steps of a procedure of the controller 7 of the fuel cell system of the sixth embodiment of the present invention.

As in any one of the first to fifth embodiments, the display portion 30 displays discharge prompting information, after which the controller 7 decides whether or not the water held in the tank 6a has been discharged through the drain opening 8 by the user or maintenance service provider (S501). Such decision may be made based on the result of detection of the water level of the tank 6a carried out by, for example, a water level detecting means. Alternatively, the user or maintenance service provider may input to the controller 7 information indicating that the water held in the tank 6a has been drained.

If in Step S501 it is decided that the water in the tank 6a has not been drained yet (in other words, the result of Step S501 is "NO"), then the controller 7 repeatedly executes Step S501 until it is decided that the water in the tank 6a has been drained. On the other hand, if in Step S501 it is decided that the water in the tank 6a has been drained (in other words, the result of Step S501 is "YES"), then the controller 7 places the water supply valve 9 in the open state so that a fixed amount of water is supplied to the tank 6a from the water infrastructure (S502).

Next, the controller 7 instructs the display portion 30 to display discharge prompting information (S503). In response to the instruction, the display portion 30 displays the message requested.

In the fuel cell system of the present embodiment, slimes may develop on the internal wall surface of the tank 6a if undesirable germs multiply in the water of the tank 6a. The growth of such slimes can be prevented by discharging the water held in the tank 6a, as in the first to fifth embodiments; however, it is difficult to remove the slimes themselves. Accordingly, as described above, water is supplied into the tank 6a through the water supply valve 9 after the existing water in the tank 6a was drained. The inside of the tank 6a is cleaned by the water thus supplied. As a result, residual undesirable germs and their necessary nourishment which are decay factors present in the inside of the tank 6a are washed away, thereby achieving a reduction in the absolute amount. As a result, the growth of the slimes is prevented and the slimes can be removed. In comparison with the first to fifth embodiments, the present embodiment prevents more definitely the water held in the tank 6a from decaying.

Embodiment 7

A fuel cell system according to a seventh embodiment of the present invention is capable of effectively removing undesirable germs by drying the inside of the tank after the discharging of the water in the tank, as in the case of the first to fifth embodiments.

Figure 9:
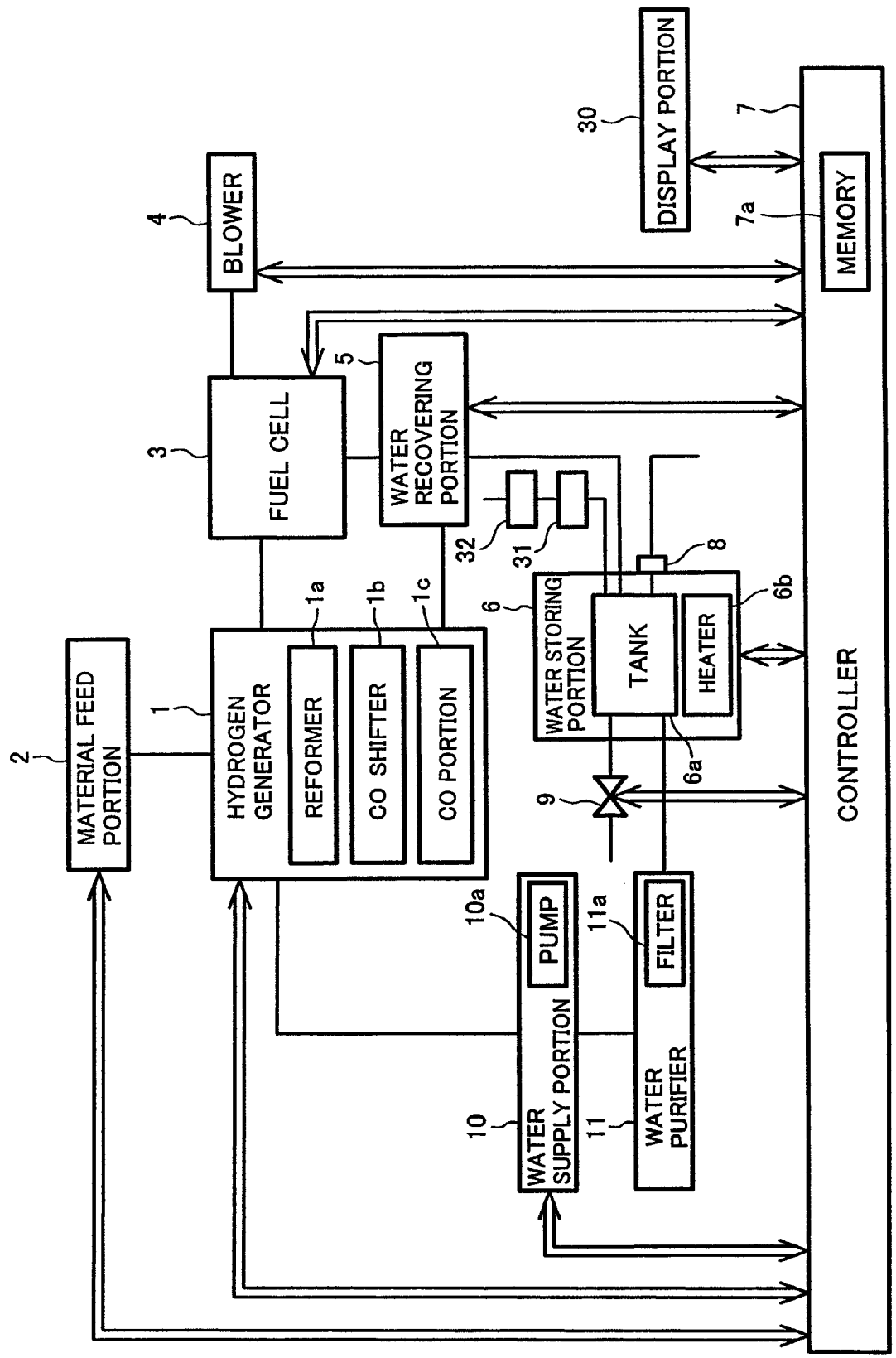
FIG. 9 is a block diagram showing a constructional arrangement of a fuel cell system according to a seventh embodiment of the present invention.

Referring to FIG. 9, there is shown a block diagram illustrating a constructional arrangement of the fuel cell system according to the seventh embodiment of the present invention. As shown in FIG. 9, in the fuel cell system of the present embodiment, the water storing portion 6 is provided with a heater 6b having an electric heater for heating the tank 6a and a temperature sensor for measuring the temperature of heating by the electric heater.

The controller 7 controls the operation of the heater 6b of the water storing portion 6 and receives a signal indicative of a measured value by the temperature sensor of the heater 6b (hereinafter referred to as the temperature measurement signal).

With respect to other constructional components, the fuel cell system of the present embodiment and the fuel cell system of the first embodiment are substantially the same. Accordingly, they are assigned the same reference numerals and their description is omitted.

Next, the operation of the fuel cell system of the present embodiment as constructed above will be described.

Figure 10:
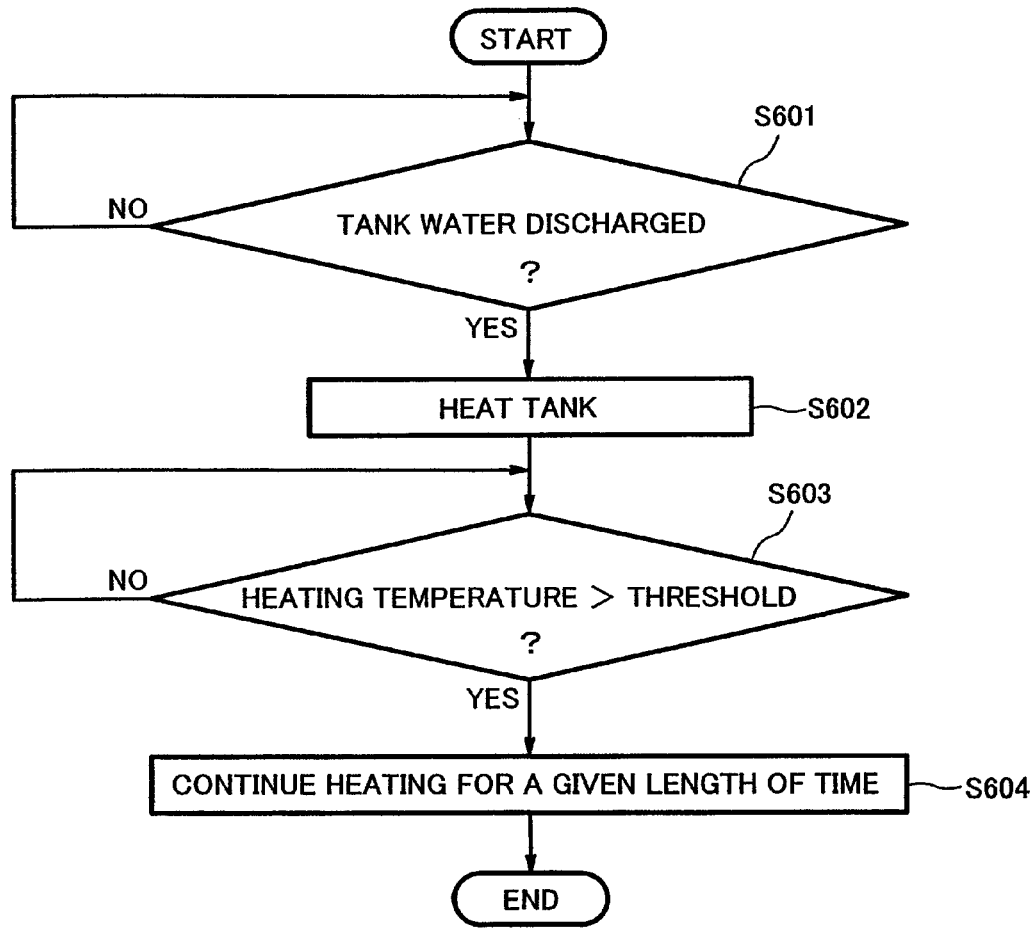
FIG. 10 is a flow chart showing steps of a procedure of a controller 7 of the fuel cell system according of the seventh embodiment of the present invention.

Referring to FIG. 10, there is shown a flow chart illustrating steps of a procedure of the controller 7 of the fuel cell system according to the seventh embodiment of the present invention.

As in any one of the first to fifth embodiments, the display portion 30 displays discharge prompting information. Thereafter, the controller 7 decides whether or not the water held in the tank 6a has been drained through the drain opening 8 by the user or maintenance service provider (S601), as in the sixth embodiment. If in Step S601 it is decided that the water in the tank 6a has not been drained yet (in other words, the result of Step S601 is "NO"), then the controller 7 repeatedly executes Step S601 until Step S601 decides that the water held in the tank 6a has been drained. On the other hand, if in Step S601 it is decided that the water in the tank 6a has been drained (in other words, the result of Step S601 is "YES"), then the controller 7 activates the electric heater of the heater 6a so that the tank 6a is subjected to heating treatment (S602).

Next, based on the temperature measurement signal received from the water storing portion 6, the controller 7 decides whether or not the temperature of heating by the electric heater of the heater 6b is higher than the threshold (S603). Here, the threshold is so set as to fall in the range of from about 100 to about 130 degrees Centigrade. The reason for such a temperature setting is that the inside of the tank 6a cannot be dried if the heating temperature of the electric heater is below 100 degrees Centigrade. On the other hand, if the heating temperature is above 130 degrees Centigrade, this necessitates that the tank 6a must be formed using members of high resistance to heat, thereby producing the problem that the system production cost becomes high. Within the foregoing temperature range, it is possible to effectively eliminate undesirable germs present in the inside of the tank 6a.

If in Step S603 it is decided that the heating temperature of the electric heater is below the threshold (in other words, the result of Step S603 is "NO"), then the controller 7 repeatedly executes Step S603 until it is decided that the heating temperature is in excess of the threshold. On the other hand, if in Step S603 it is decided that the heating temperature of the electric heater exceeds the threshold (in other words, the result of Step S603 is "YES"), then the controller 7 maintains the operation of the electric heater of the heater 6a for a predetermined length of time so that heating is continued for that length of time (S604).

If there still remains a small amount of moisture in the inside of the tank 6a in the fuel cell system of the present embodiment after the discharging of the water in the tank 6a, undesirable germs will multiply by making utilization of such residual moisture. Particularly, in the case where the fuel cell system is brought down over a long term, generation of slimes will occur early on the internal wall surface of the tank 6a by multiplying germs, when the fuel cell system is activated again. Accordingly, such residual moisture is removed by drying the inside of the tank 6a as in the case of the present embodiment, thereby early avoiding generation of slimes.

In addition, in accordance with the present embodiment, the inside of the tank 6a is dried by application of heat. As a result, undesirable germs present in the inside of the tank 6a are eliminated effectively.

In comparison with the first to fifth embodiments, the fuel cell system of the present embodiment prevents more definitely the water held in the tank 6a from decaying.

In addition, in the present embodiment, it is arranged such that the inside of the tank 6a is dried by application of heat to the tank 6a by the electric heater of the heater 6b; however, this arrangement should not in any way be deemed restrictive. For example, the inside of the tank 6a may be dried by delivering a stream of heated air into the tank 6a.

In addition, also in the present embodiment, it may be arranged such the inside of the tank 6a is cleaned by supplying water into the tank 6a through the water supply valve 9 as in the sixth embodiment and thereafter the inside of the tank 6a is dried by application of heat to the tank 6a by the heater 6b.

Embodiment 8

A fuel cell system according to an eighth embodiment of the present invention is configured such that the tank of the water storing portion is divided into two sub-tanks so that, even when the water held in one sub-tank is drained for the purpose of the prevention of water decay, it is still possible to continuously provide a supply of water to the hydrogen generator from the other.

Figure 11:
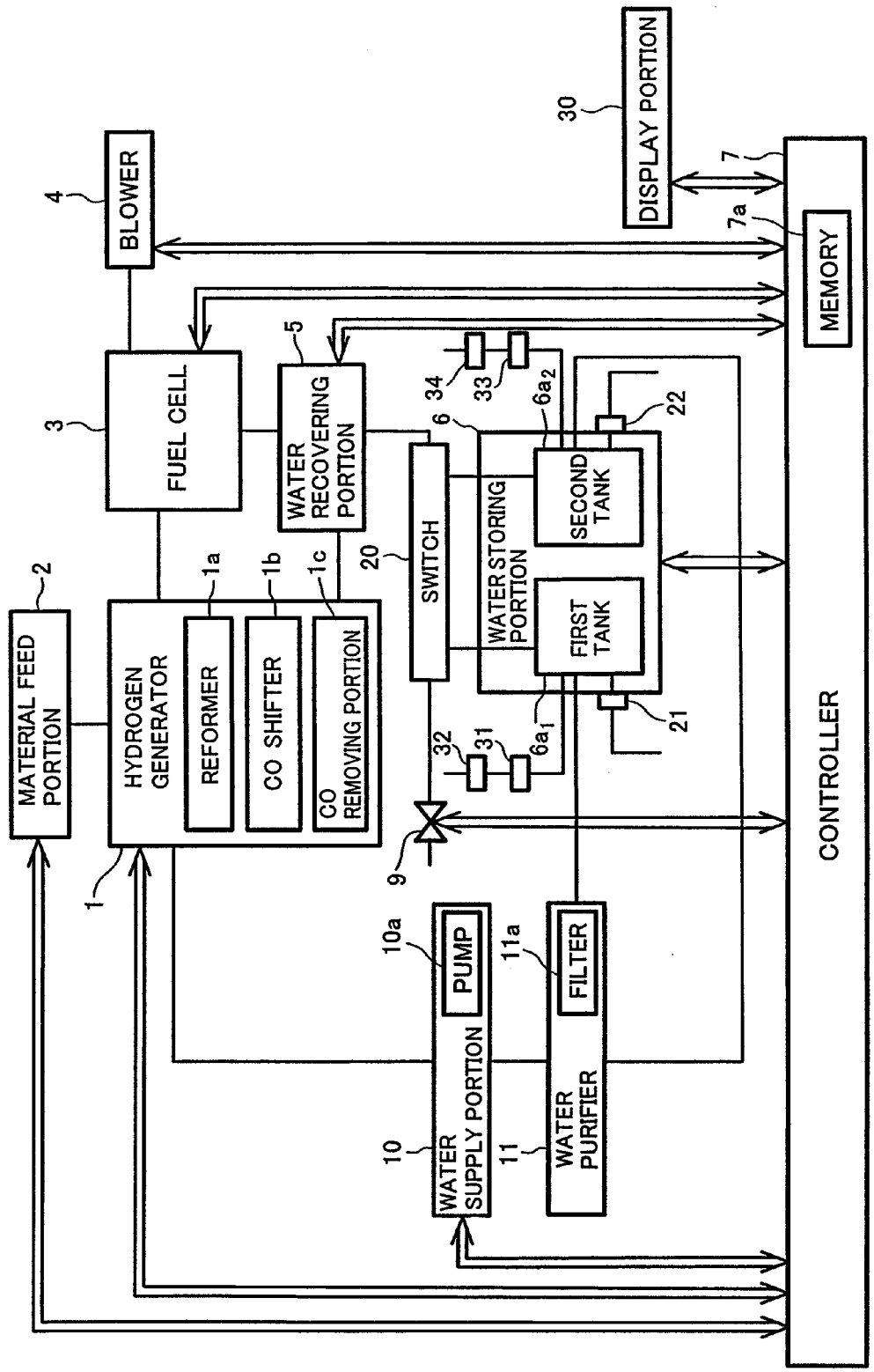
FIG. 11 is a block diagram showing a constructional arrangement of a fuel cell system according to an eighth embodiment of the present invention.

Referring to FIG. 11, there is shown a block diagram illustrating a constructional arrangement of the fuel cell system formed in accordance with the eighth embodiment of the present invention. As shown in FIG. 11, the water storing portion 6 of the fuel cell system of the present embodiment is provided with a first tank 6a1 and a second tank 6a2 for the storage of water supplied from the water recovering portion 5 and water supplied via the water supply valve 9. The first and second tanks 6a1 and 6a2 are each connected to a switch 20 formed by a switching valve by which the destination, to which water supplied from the water supply portion 5 and water supplied through the water supply valve 9 should be distributed, is switched between the first tank 6a1 and the second tank 6a2.

The switch 20 is connected to the controller 7 and the operation of the switching valve of the switch 20 is controlled by the controller 7.

In addition, the first and second tanks 6a1 and 6a2 are connected to a first drain opening 21 and to a second drain opening 22 respectively so that water held in the former and water held in the latter are drained through these openings respectively.

With respect to other constructional components, the fuel cell system of the eighth embodiment and the fuel cell system of the first embodiment are substantially the same. Accordingly, they are assigned the same reference numerals and their description is omitted.

Next, the operation of the fuel cell system of the eighth embodiment as constructed above will be described.

As in the case of the first embodiment, in the fuel cell system of the fourth embodiment, hydrogen gas is generated in the hydrogen generator 1 and the fuel cell 3 generates electric power using the hydrogen gas and air. And, water generated during the electric power generation is recovered by the water recovering portion 5. The water recovering portion 5 supplies the recovered water to the switch 20 so that the recovered water is supplied to the water storing portion 6.

Based on the control signal outputted from the controller 7, the switch 20 switches the destination, to which the water supplied from the water recovering portion 5 is distributed, between the first tank 6a1 and the second tank 6a2 at predetermined timing. As a result of such arrangement, the first and second tanks 6a1 and 6a2 are supplied with water in alternation.

The controller 7 instructs the display portion 30 to display either first discharge prompting information prompting the user or maintenance service provider to discharge the water held in the first tank 6a1 through the first drain opening 21 or second discharge prompting information prompting the user or maintenance service provider to discharge the water held in the second tank 6a2 through the second drain opening 22.

In the present embodiment, the controller 7 decides whether or not to discharge the water held in one of the first and second tanks 6a1 and 6a2 that is not being supplied with water, as in the case of any one of the first to fifth embodiments. If it is decided that the water should be discharged, then the controller 7 instructs the display portion 30 to display either the first discharge prompting information or the second discharge prompting information in order to prompt the user or maintenance service provider to do so.

As a result, when the display portion 30 displays the first discharge prompting information, the water held in the first tank 6a1 is drained through the first drain opening 21 by the user or maintenance service provider. On the other hand, when the display portion 30 displays the second discharge prompting information, the water held in the second tank 6a2 is drained through the second drain opening 22 by the user or maintenance service provider.

Here, the water held in the other of the first and second tanks 6a1 and 6a2 that is being supplied with water is not drained and is supplied to the hydrogen generator 1 through the water purifier 11 and through the water supply portion 10. As a result of such arrangement, it is possible to continuously supply the water held in one tank to the hydrogen generator 1 and at the same time to drain the water held in the other for the purpose of the prevention of water decay.

In the present embodiment, preferably the timing, at which the destination to which water is distributed is switched between the first and second tanks 6a1 and 6a2, is set in the light of the size of fuel cell system and in the light of the actual operating performance of fuel cell system so that water decay prevention is carried out effectively.

In the present embodiment, the water storing portion 6 is provided with two tanks, i.e., the first and second tanks 6a1 and 6a2. For example, it may be arranged such that the water storing portion 6 is provided with three or more tanks. In the case where the water storing portion 6 is provided with three or more tanks, it suffices if water is supplied to each tank one after the other and the display portion 30 displays discharge prompting information indicating that a tank that was first supplied with water should be drained.

In addition, also in the present embodiment, it is possible to more definitely prevent water decay by cleaning the inside of each tank as in the case of the sixth embodiment and by drying the inside of each tank as in the case of the seventh embodiment.

Embodiment 9

A fuel cell system according to a ninth embodiment of the present invention is configured such that water in the tank is prevented from decaying by application of heat to the tank water by means of the heater of the water storing portion.

Figure 12:
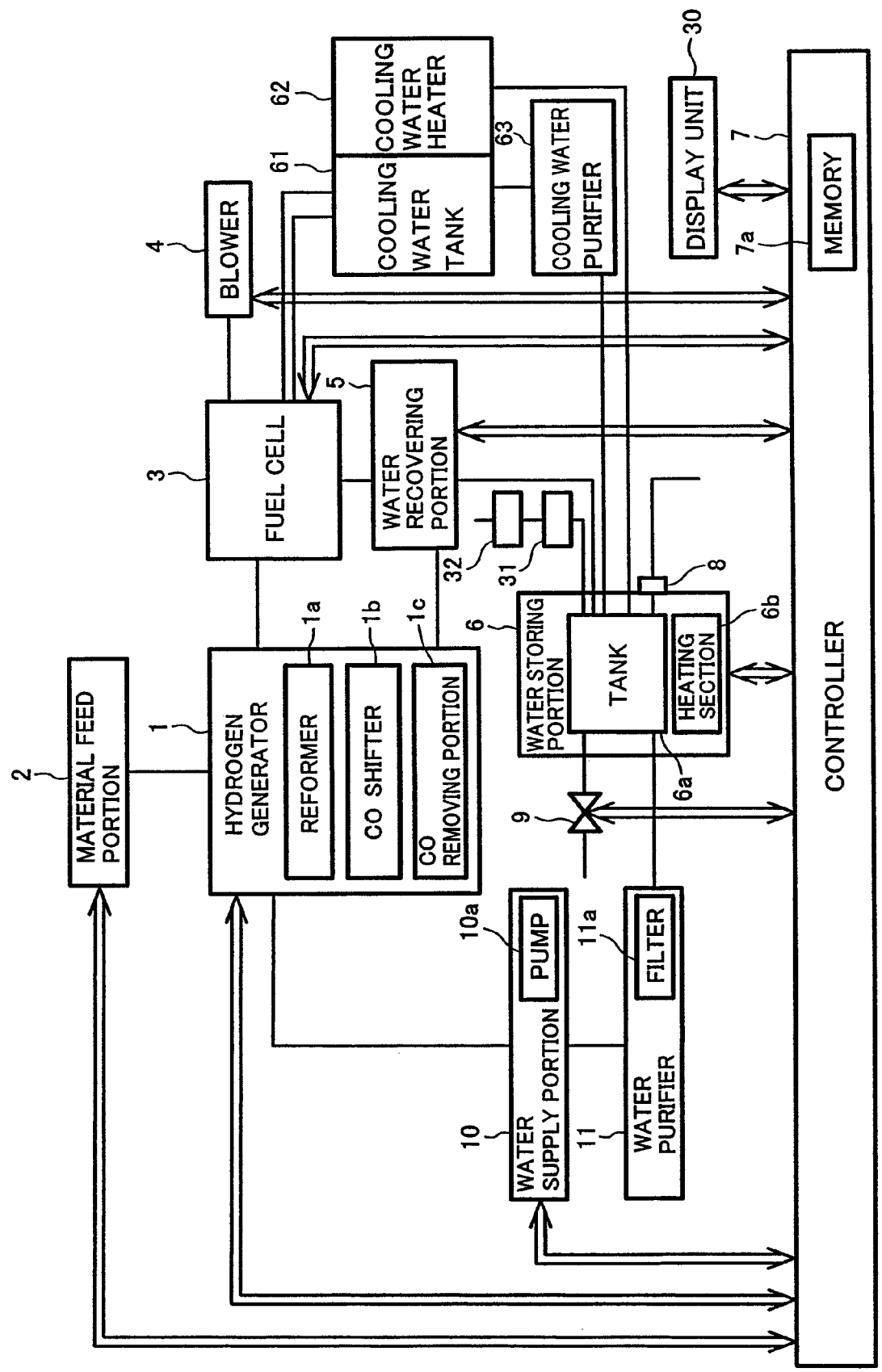
FIG. 12 is a block diagram showing a constructional arrangement of a fuel cell system according to a ninth embodiment of the present invention.

Referring to FIG. 12, there is shown a block diagram illustrating a constructional arrangement of the fuel cell system according to the ninth embodiment of the present invention. As shown in FIG. 12, the water storing portion 6 of the fuel cell system of the present embodiment is provided with a heater 6b comprising an electric heater for heating the tank 6a and a temperature sensor for measuring the temperature of heating by the electric heater.

The controller 7 controls the operation of the heater 6b of the water storing portion 6 and receives from the water storing portion 6 a temperature measurement signal indicative of a measured value by the temperature sensor of the heater 6b.

In addition, the fuel cell system of the present embodiment is further provided with a cooling water tank 61 adapted for storing cooling water which is circulated through the fuel cell 3 for controlling the temperature thereof, and a cooling water heater 62 adapted for heating cooling water held in the cooling water tank 61. The cooling water tank 61 and the fuel cell 3 are connected together by two channels, namely a channel for supplying water to the fuel cell 3 from the cooling water tank 61 and another channel for supplying water to the cooling water tank 61 from the fuel cell 3.

Furthermore, the fuel cell system of the present embodiment is further provided with a cooling water purifier 63 for purifying cooling water, and the cooling water tank 61 and the tank 6a of the water storing portion 6 are connected together by two channels, i.e., one passing through the cooling water purifier 63 and the other passing through the cooling water purifier 63. And, when water is supplied to the tank 6a from the cooling water tank 61, the water is supplied without passing through the water purifier 63. On the other hand, when water is supplied to the cooling water tank 61 from the tank 6a, the water is supplied through the water purifier 63.

With respect to other constructional components, the fuel cell system of the present embodiment and the fuel cell system of the first embodiment are substantially the same. Accordingly, they are assigned the same reference numerals and their description is omitted.

Next, the operation of the fuel cell system of the present embodiment as constructed above will be described.

Also in the fuel cell system of the present embodiment, it is arranged such that the display portion 30 displays discharge prompting information at predetermined timing in order to draw the user's or maintenance service provider's attention to the discharging of the water held in the tank 6a, as in the case of the first to fifth embodiments. In addition, apart from this operation, water decay is prevented definitely by application of heat to the water in the tank 6a in the following way.

In the water storing portion 6, water delivered from the water recovering portion 5 and water delivered from the cooling water tank 61 are stored in the tank 6a. And, based on the control signal outputted from the controller 7, the heater 6b of the water storing portion 6 is operated so that heating treatment for heating the water held in the tank 6a is carried out. In this case, preferably the heating temperature is set to a value capable of completely eliminating undesirable germs and molds present in the water held in the tank 6a. Most of the germs can be eliminated by heating at temperatures in the range of from 80 to 90 degrees Centigrade for several minutes. In the light of this, the controller 7 controls the operation of the heater 6b so that the heating temperature of about 90 degrees Centigrade is maintained for about ten minutes or so.

The heating temperature of the heater 6b may be determined taking into consideration the heat or pressure resisting properties of its constructional members. However, when the heating temperature is set above 100 degrees Centigrade, this necessitates use of members that can withstand high temperatures. Therefore, it must be noted that the costs of manufacture will increase in this case.

In addition, there is a correlation between the germ eliminating time and the germ eliminating temperature. Therefore, if the heating temperature is relatively low, this requires an extension of the heating time. On the other hand, if the heating temperature is relatively high, a shorter heating time will suffice.

The controller 7 controls the heater 6b to force it to repeatedly perform the above-described heating treatment at constant intervals of time. This makes it possible to prevent mold spores that can survive even at about 90 degrees Centigrade and undesirable germs from the outside from re-multiplying in the water held in the tank 6a. At which interval that heating treatment is to be carried out should be determined in the light of the operating conditions and the installation place of fuel cell system and in the light of the multiplication state of undesirable germs.

The water in the tank 6a heated by the heater 6b is supplied to the water purifier 11 and to the cooling water purifier 63. Passing through the filter 11a of the water purifier 11, the water is purified. Then, the water is supplied to the water supply portion 10 for forwarding to the hydrogen generator 1. This makes it possible for the hydrogen generator 1 to receive a supply of water which is required for a reforming reaction.

On the other hand, the water, purified when passing through the cooling water purifier 63, is supplied to the cooling water tank 61. This makes it possible for the cooling water tank 61 to receive a supply of cooling water to be circulated in the fuel cell 3.

As described above, the water, recovered by the water recovering portion 5, stored in the cooling water tank 61, and then stored in the tank 6a of the water storing portion 6, is subjected to heating treatment by the heater 6b. As a result, undesirable germs present in the recovered water are eliminated. In addition, alcohol of low boiling point and aldehyde components which become nutriments for undesirable germs can be evaporated, thereby making the multiplication rate of undesirable germs as low as possible. This prevents water decay and therefore avoids the occurrence of problems such as flow path blockage in the piping.

In the above, heating treatment is carried out at predetermined intervals of time when the fuel cell system of the present embodiment is being in service, i.e., when the hydrogen generator 1 is generating hydrogen gas and the fuel cell 3 is producing electric power by the use of the hydrogen gas. However, the fuel cell system of the present invention is not limited to such operations. For example, it may be arranged such that only the heater 6b of the water storing portion 6 is brought into activation without activating constructional elements other than the heater 6b, so that only heating treatment by the heater 6b is made executable. This arrangement that only heating treatment by the heater 6b is made executable makes it possible to first eliminate undesirable germs reproduced in the water held in the tank 6a of the water storing portion 6 by performing heating treatment, for example when the fuel cell system has been stopped for a long period of time, and then to perform normal operations.

In addition, also in the present embodiment, it is possible to prevent water decay more definitely by cleaning the inside of the tank as in the case of the sixth embodiment or by drying the inside of the tank as in the case of the seventh embodiment.

Embodiment 10

A fuel cell system formed in accordance with a tenth embodiment of the present invention is provided, between the water storing portion and the water purifier, a cooler for the cooling of recovered water. The provision of the cooler makes it possible to prevent water of high temperature from being supplied to the water purifier.

Figure 13:
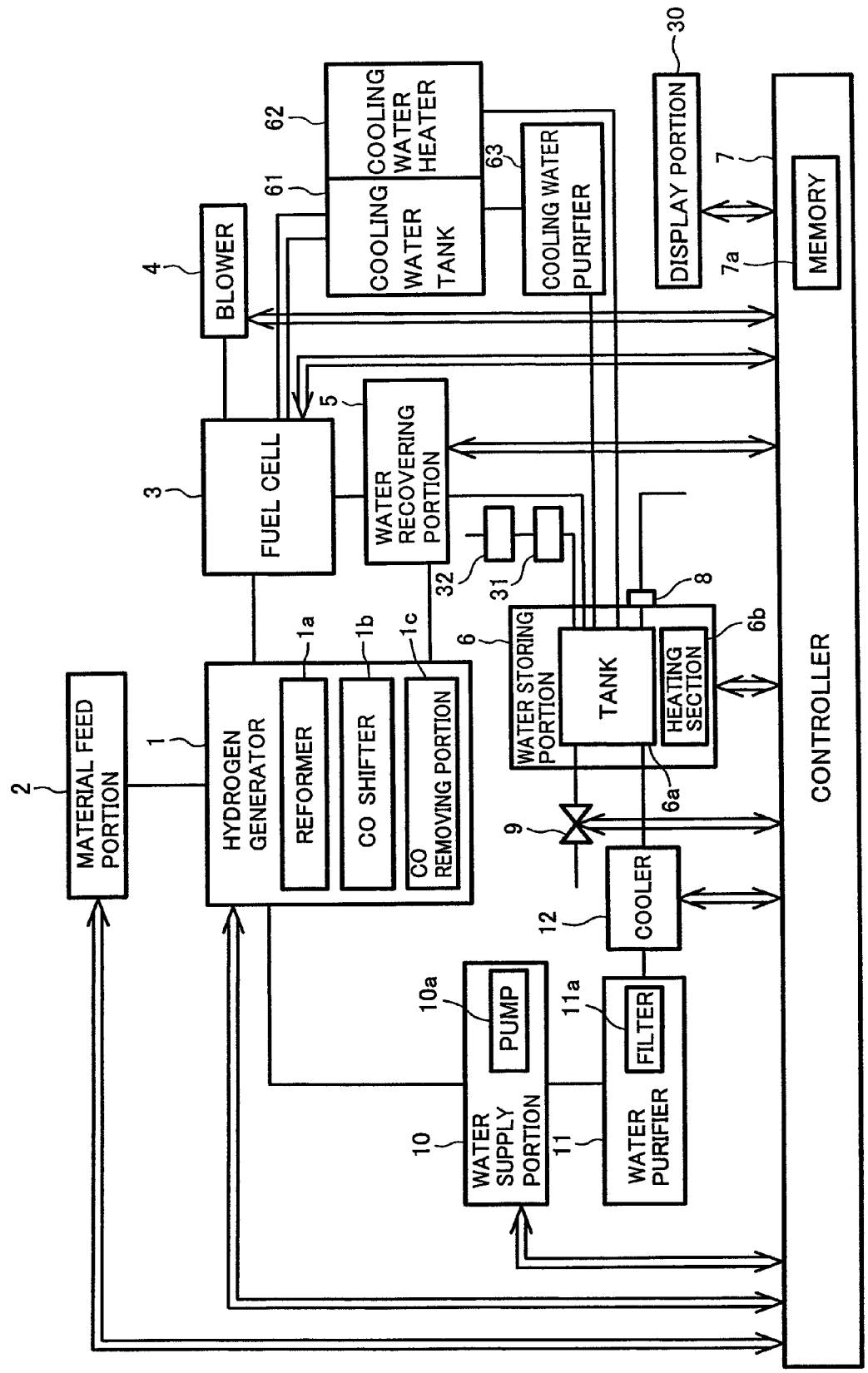
FIG. 13 is a block diagram showing a constructional arrangement of a fuel cell system according to a tenth embodiment of the present invention.

Referring to FIG. 13, there is shown a block diagram illustrating a constructional arrangement of the fuel cell system of the tenth embodiment. As shown in FIG. 13, the fuel cell system of the present embodiment is provided with a cooler 12 which is connected to the water storing portion 6 and to the water purifier 11 and which has an air cooling fan for the cooling of water which is supplied to the water purifier 11 from the water storing portion 6. The cooler 12 is connected to the controller 7, and operates based on the control signal outputted from the controller 7.

With respect to other constructional components, the fuel cell system of the present embodiment and the fuel cell system of the ninth embodiment are substantially the same. Accordingly, they are assigned the same reference numerals and their description is omitted.

Next, the operation of the fuel cell system of the present embodiment as constructed above will be described.

Also in the fuel cell system of the present embodiment, it is arranged such that the display portion 30 displays discharge prompting information at predetermined timing in order to draw the user's or maintenance service provider's attention to the discharging of the water in the tank 6a, as in the case of the first to fifth embodiments. In addition, apart from this operation, water decay is prevented definitely by application of heat to the water in the tank 6a in the following way.

As in the case of the ninth embodiment, in the fuel cell system of the present embodiment the hydrogen generator 1 generates hydrogen gas and the fuel cell 3 generates electric power by the use of the hydrogen gas and air. And, water generated during the electric power generation is recovered by the water recovering portion 5 and the recovered water is stored in the tank 6a of the water storing portion 6. Water supplied from the cooling water tank 61 is likewise stored in the tank 6a. The water thus stored in the tank 6a is heated at a heating temperature of about 90 degrees Centigrade for a predetermined length of time by the heater 6b.

In the way as described above, the water heated by the heater 6b is supplied to the cooler 12 from the water storing portion 6. Based on the control signal outputted from the controller 7, the air cooling fan of the cooler 12 operates to cool the water supplied from the water storing portion 6. And, the cooler 12 supplies the cooled water to the water purifier 11. Here, it suffices if the cooler 12 is activated in conjunction with the heater 6b of the water storing portion 6, so that there is no need to constantly operate the cooler 12. In other words, since the heater 6b repeatedly performs heating treatment at predetermined intervals of time (as described above), it suffices if the cooler 12 is made to operate only when water heated by such heating treatment is supplied from the water storing portion 6.

In the water purifier 1, the water cooled by the cooler 12 is purified by the filter 11a and the water purified is supplied to the water supply portion 10. And, the water supply portion 10 supplies the water supplied from the water purifier 11 to the hydrogen generator 1. In this way, the hydrogen generator 1 is provided with a supply of water which is necessary for a reforming reaction.

If water heated by the heater 6a is supplied, without being cooled, to the water purifier 11, there is the danger that the water purifying function of the activated carbon or ion exchange resin becomes worse. In the fuel cell system of the present embodiment, however, the cooler 12 is activated in the way as described above, whereby cooled water is supplied to the water purifier 11. Such arrangement prevents deterioration of the water purifying function of the water purifier 11.

In the case where both the water purifier 11 and the water supply portion 10 are constructed of members having resistance to heat, the problem of water purifying function deterioration will not occur even when the cooler 12 is not provided.

In addition, also in the present embodiment, it is possible to prevent water decay more definitely by cleaning the inside of the tank as in the case of the sixth embodiment or by drying the inside of the tank as in the case of the seventh embodiment.

Embodiment 11

A fuel cell system formed in accordance with an eleventh embodiment of the present invention is provided with a water vapor exhausting valve for preventing the rise in pressure of the inside of the water storing portion.

Figure 14:
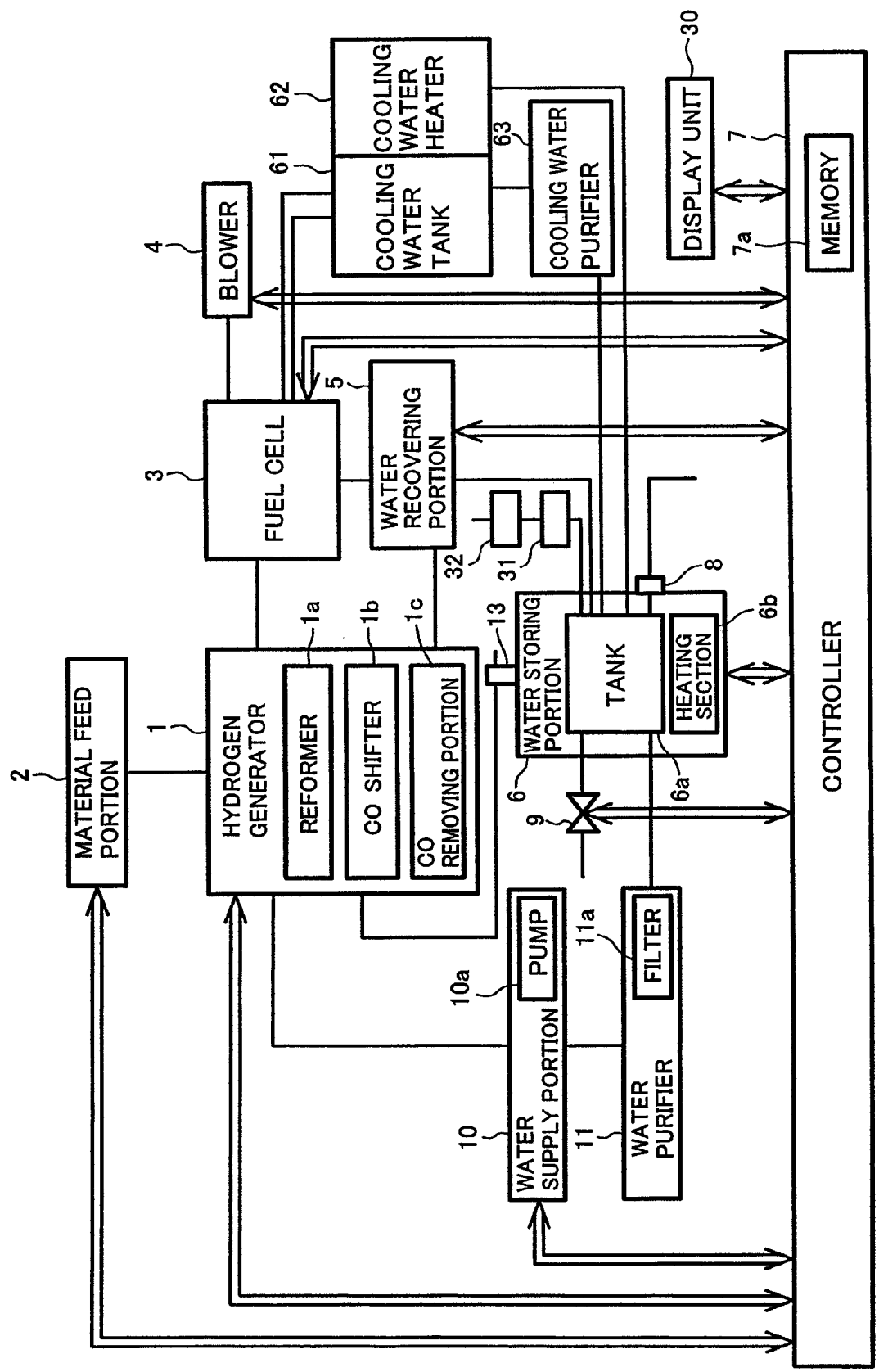
FIG. 14 is a block diagram showing a constructional arrangement of a fuel cell system according to an eleventh embodiment of the present invention.

Referring to FIG. 14, there is shown a block diagram illustrating a constructional arrangement of the fuel cell system according to the eleventh embodiment. As shown in FIG. 14, the water storing portion 6 of the fuel cell system of the present embodiment is provided with a water vapor exhausting valve 13 which discharges water vapor accompanied by heat processing by the heater 6b. With respect to other constructional components, the fuel cell system of the present embodiment and the fuel cell system of the ninth embodiment are substantially the same. Accordingly, they are assigned the same reference numerals and their description is omitted.

Next, the operation of the fuel cell system of the eleventh embodiment as constructed above will be described.

Also in the fuel cell system of the present embodiment, it is arranged such that the display portion 30 displays discharge prompting information at predetermined timing in order to draw the user's or maintenance service provider's attention to the discharging of the water held in the tank 6a, as in the case of the first to fifth embodiments. In addition, apart from this operation, water decay is prevented definitely by application of heat to the water in the tank 6a in the following way.

As in the case of the first embodiment, in the fuel cell system of the present embodiment the hydrogen generator 1 generates hydrogen gas and the fuel cell 3 generates electric power by the use of the generated hydrogen gas and air. And, water generated during the electric power generation is recovered by the water recovering portion 5 and the recovered water is stored in the tank 6a of the water storing portion 6. In addition, water supplied from the cooling water tank 61 is likewise stored in the tank 6a. In this way, the water thus held in the tank 6a is heated at a heating temperature of about 90 degrees Centigrade for a predetermined length of time by the heater 6b.

In the case where undesirable germs having resistance to heat multiply, it is necessary to apply heat to the water at a temperature high enough to eliminate the germs. However, if the heater 6b performs heat processing at such a high temperature, this accompanies water vapor generation, as a result of which the pressure of the inside of the water storing portion 6 increases. Therefore, the water storing portion 6 is required to have considerable resistance to pressure. This may increase the production costs of a fuel cell system. To cope with this problem, the water vapor exhausting valve 13 of the water storing portion 6 is operated based on the control signal outputted from the controller 7 so that water vapor accompanied by heating treatment by the heater 6b is emitted. This makes it possible to avoid the rise in pressure of the inside of the water storing portion 6.

The water vapor discharged through the water vapor exhausting valve 13 is exhausted to outside the fuel cell system and, at the same time, is supplied to the hydrogen generator 1 and utilized in a reforming reaction for hydrogen gas generation. Because of such arrangement, thermal energy consumed during water vapor generation is utilized effectively.

In addition, the fuel cell system of the present embodiment may be provided, between the water storing portion 6 and the water purifier 11, with a cooler 12. In addition, it is possible to prevent water decay more definitely by cleaning the inside of the tank as in the case of the sixth embodiment or by drying the inside of the tank as in the case of the seventh embodiment.

Embodiment 12

A fuel cell system formed in accordance with a twelfth embodiment of the present invention is configured such that the tank of the water storing portion is divided into two tanks as in the case of the eighth embodiment for allowing the water purifier to operate efficiently.

Figure 15:
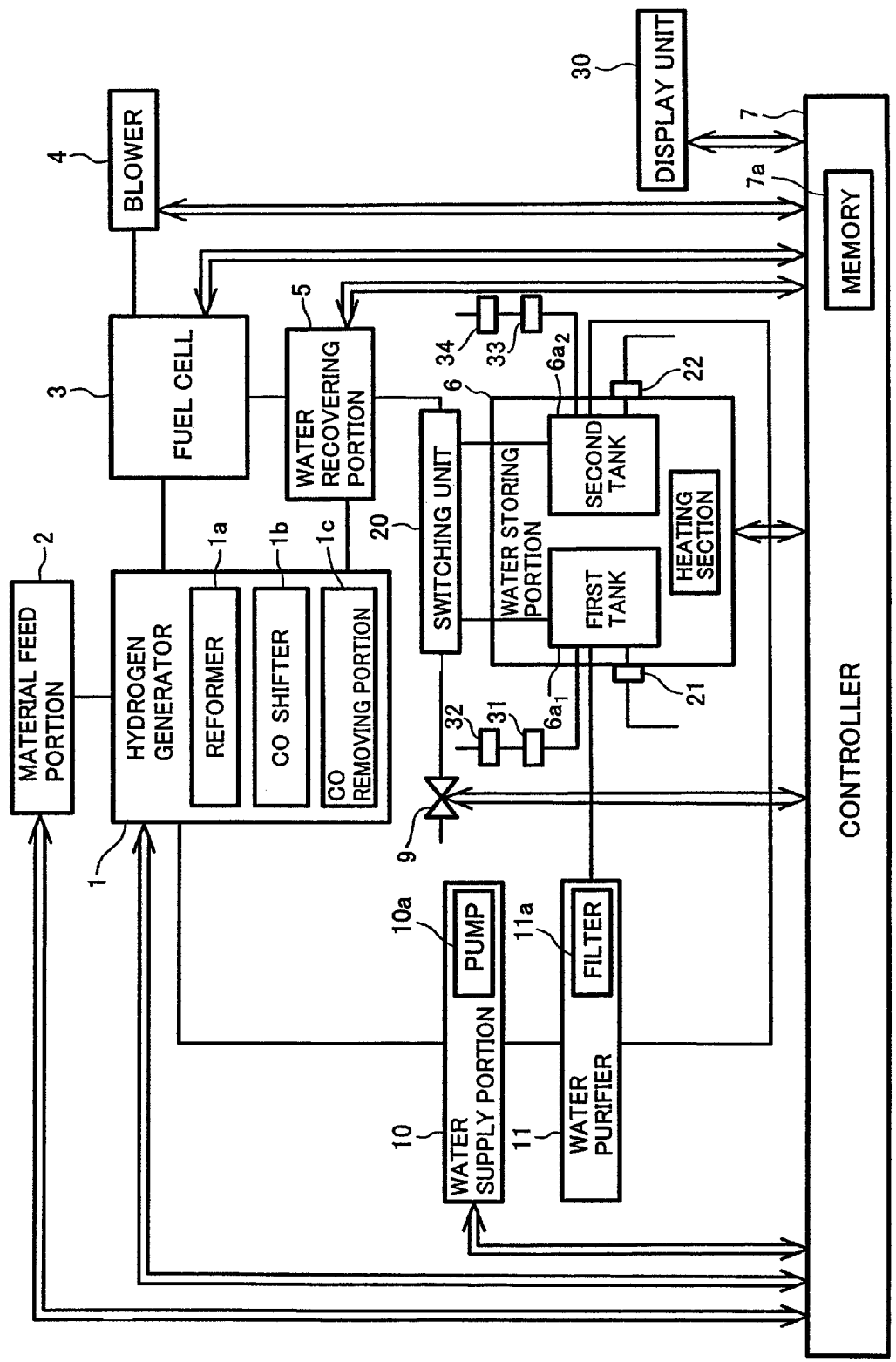
FIG. 15 is a block diagram showing a constructional arrangement of a fuel cell system according to a twelfth embodiment of the present invention.

Referring to FIG. 15, there is shown a block diagram illustrating a constructional arrangement of the fuel cell system according to the twelfth embodiment. As shown in FIG. 15, the water storing portion 6 of the fuel cell system of the present embodiment is provided with a heater 6b having an electric heater for heating the tank 6a and a temperature sensor for measuring the temperature of heating by the electric heater.

The controller 7 controls the operation of the heater 6b of the water storing portion 6 and receives from the water storing portion 6 a temperature measurement signal representative of a measured value by the temperature sensor of the heater 6b.

With respect to other constructional components, the fuel cell system of the twelfth embodiment and the fuel cell system of the eighth embodiment are substantially the same. Accordingly, they are assigned the same reference numerals and their description is omitted.

Next, the operation of the fuel cell system of the twelfth embodiment as constructed above will be described.

Also in the fuel cell system of the present embodiment, it is arranged such that the display portion 30 displays discharge prompting information at predetermined timing in order to draw the user's or maintenance service provider's attention to the discharging of water in the tank 6a, as in the case of the first to fifth embodiments. In addition, apart from this operation, water decay is prevented definitely by application of heat to the water in the tank 6a in the following way.

As in the case of the ninth embodiment, in the fuel cell system of the present embodiment the hydrogen generator 1 generates hydrogen gas and the fuel cell 3 generates electric power by the use of the generated hydrogen gas and air. And, water generated during the electric power generation is recovered by the water recovering portion 5. The water recovering portion 5 supplies the recovered water to the switch 20 so that the recovered water is supplied to the water storing portion 6. Based on the control signal outputted from the controller 7, the switch 20 switches the destination, to which the water supplied from the water recovering portion 5 is distributed, between the first tank 6a1 and the second tank 6a2 at predetermined timing. As a result of such arrangement, the first and second tanks 6a1 and 6a2 are supplied with water in alternation fashion.

As in the case of the ninth embodiment, the heater 6b of the water storing portion 6 repeatedly executes heating treatment at predetermined intervals of time. Here, the heater 6b performs heating treatment on the first tank 6a1 and on the second tank 6a2 in alternation. In other words, for example, if the heater 6b performs heating treatment on the water held in the first tank 6a1, the next heating treatment will be performed on the water held in the second tank 6a2.

The water storing portion 6 supplies the heated water in the tanks 6a1 and 6a2 to the water purifier 11. Here, the water storing portion 6 supplies to the water purifier 11 the water held in one of the tanks that has undergone a longer elapsed time since the completion of heating treatment than the other. As a result of such arrangement, the heated water, whose temperature has lowered sufficiently, is supplied to the water purifier 11.

If the elapsed time since the completion of heating treatment is greater than a predetermined length of time, this increases the probability that undesirable germs grow up. Accordingly, in such a case, preferably a supply of water is provided by the other tank.

And now, as described above, the recovered water supplied from the water recovering portion 5 by the switch 20 is supplied to the first tank 6a1 and to the second tank 6a2 in alternation. If it is arranged such that heating treatment is performed on the water held in the second tank 6a2 when recovered water is supplied to the first tank 6a1, i.e., when the first tank 6a1 is in water storing operation while on the other hand heating treatment is performed on the water held in the first tank 6a1 when recovered water is supplied to the second tank 6a2, i.e., when the second tank 6a2 is in water storing operation, this makes it possible for the heater 6b to perform heating treatment on the first tank 6a1 and on the second tank 6a2 in alternation, as described above.

As previously described in the tenth embodiment, if water heated by the heater 6b to a high temperature is supplied to the water purifier 11 as it is, there is the danger that the water purifying function of the activated carbon or ion exchange resin deteriorates. In the fuel cell system of the present embodiment, water, whose temperature has lowered sufficiently, is supplied to the water purifier 11. This makes it possible to prevent the drop in water purifying function of the water purifier 11.

In the present embodiment, the water storing portion 6 is provided with two tanks, i.e., the first and second tanks 6a1 and 6a2. For example, it may be arranged such that the water storing portion 6 is provided with three or more tanks. In the case where the water storing portion 6 is provided with three or more tanks, it may be arranged such that heating treatment by the heater 6b is sequentially performed on each tank and the water held in a tank that has first undergone heating treatment is supplied to the water purifier 11.

Furthermore, the fuel cell system of the present embodiment may be provided, between the water storing portion 6 and the water purifier 11, with a cooler 12, as in the case of the tenth embodiment. In addition, needless to say, the fuel cell system of the present embodiment may be provided with a water vapor exhausting valve 13, as in the case of the eleventh embodiment. Furthermore, it is possible to prevent water decay more definitely by cleaning the inside of each tank as in the case of the sixth embodiment or by drying the inside of each tank as in the case of the seventh embodiment.

In addition, a new type of fuel cell system may be configured by adequate combination of two or more of the foregoing embodiments.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the sprit of the invention and all modifications which come within the scope of the appended claims are reserved.

INDUSTRIAL APPLICABILITY

The present invention provides fuel cell systems each of which is useful as an electric power generator capable of producing electric power at high level of efficiency for their small size.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of operating a fuel cell system, the fuel cell system including a fuel cell equipped with an anode and a cathode, the method comprising the steps of:
generating electric power by allowing hydrogen gas supplied to the anode and oxygen gas supplied to the cathode to react electrochemically with each other;
recovering water from water vapor discharged from at least one of the anode and cathode;
storing recovered water in a water storing portion equipped with a tank having a closable drain opening, through which opening water stored in the tank is dischargeable to outside the fuel cell system;
supplying water stored in the tank to a water utilizing means by a water supply portion; and
making a decision to discharge the stored water to outside the fuel cell system through the drain opening before blockage of a flow path between the tank and the water utilizing means occurs, said blockage being caused by an increase in an amount of undesirable germs contained in water stored in the water storing portion.

2. The method as set forth in claim 1, further comprising the step of:
outputting discharge prompting information indicative of the discharging of the stored water to outside the fuel cell system, when the decision is made that water stored in the tank is to be discharged outside the fuel cell system.

3. The method as set forth in claim 2, wherein the decision is made based on an accumulated operating time of the fuel cell system.

4. The method as set forth in claim 2, wherein the decision is made based on an accumulated downtime of the fuel cell system.

5. The method as set forth in claim 2, wherein the water supply portion has a pump for transporting water stored in the tank, the method further comprising the step of:
purifying the water by a filter disposed between the tank and the pump, wherein the decision is made based on a flow rate of water output from the pump.

6. The method as set forth in claim 2, wherein the water supply portion has a pump for transporting water stored in the tank, the method further comprising the step of:
purifying the water by a filter disposed between the tank and the pump, wherein the decision is made based on an operating state of the pump.

7. The method as set forth in claim 1, further comprising the steps of:
discharging the water stored in the tank to outside the fuel cell system; and
drying an inside of said tank.

8. The method as set forth in claim 7, further comprising the step of:
heating the tank with a heater to dry the inside of the tank.

9. The method as set forth in claim 8, further comprising the step of:
heating the tank at a temperature within a range of 100 to 130 degrees Centigrade.

10. The method as set forth in claim 8, further comprising the step of:
heating the tank with the heater when water is stored in the tank.

11. The method as set forth in claim 10, further comprising the steps of:
cooling the water heated by said heater with a cooler; and
supplying the water cooled by the cooler from the water supply portion to the water utilizing means through a water purifier.

12. The method as set forth in claim 7, further comprising the step of:
cleaning the tank by a supply of water to the tank from outside the fuel cell system after discharging the stored water in the tank to outside the fuel cell system and before drying the inside of the tank.

13. The method as set forth in claim 12, wherein a concentration of chlorine in the water supplied from outside the fuel cell system falls within a range of 0.1 to 5 mg/l.

14. The method as set forth in claim 1, further comprising the steps of:
discharging the stored water in the tank to outside the fuel cell system; and
cleaning an inside of the tank by a supply of water to the tank from outside the fuel cell system.

15. The method as set forth in claim 2, further comprising the steps of:
sequentially storing water in a plurality of tanks of said water storing portion; and
deciding whether or not to discharge water stored in one of said plurality of tanks which is not supplying water to the water utilizing means to outside the fuel cell system.

16. The method as set forth in claim 15, further comprising the steps of:
discharging the water stored in the tank to outside the fuel cell system; and
drying an inside of the tank.

17. The method as set forth in claim 16, further comprising the step of heating the tank with a heater to dry the inside of the tank.

18. The method as set forth in claim 1, further comprising the step of:
drawing gas into the tank from outside the fuel cell system by a gas drawing portion.

19. The method as set forth in claim 18, further comprising the step of:
disposing a filter upstream of the gas drawing portion relative to the direction in which the gas flows; and
removing solid impurity components from gas by the filter.

20. The method according to claim 1, wherein the supply water is discharged to outside the fuel cell system to rid the system of germs.

21. The method according to claim 1, wherein the decision is made based on a threshold set such that the amount of undesirable germs present in the water stored in the water storing portion will not exceed a predetermined value.

* * * * *